US012368944B2

(12) United States Patent
Parsons et al.

(10) Patent No.: US 12,368,944 B2
(45) Date of Patent: Jul. 22, 2025

(54) INNER DRUM MODULE WITH PUSH-CABLE INTERFACE FOR PIPE INSPECTION

(71) Applicant: SeeScan, Inc., San Diego, CA (US)

(72) Inventors: David C. Parsons, San Marcos, CA (US); Mark S. Olsson, La Jolla, CA (US); Michael J. Martin, San Diego, CA (US); Alexander L. Warren, Escondido, CA (US); Andrew P. Corvin, San Diego, CA (US)

(73) Assignee: SeeScan, Inc., San Diego, CA (US)

( * ) Notice: Subject to any disclaimer, the term of this patent is extended or adjusted under 35 U.S.C. 154(b) by 0 days.

(21) Appl. No.: 18/747,912

(22) Filed: Jun. 19, 2024

(65) Prior Publication Data

US 2024/0430555 A1 Dec. 26, 2024

Related U.S. Application Data

(60) Provisional application No. 63/510,014, filed on Jun. 23, 2023.

(51) Int. Cl.
*H04N 23/50* (2023.01)
*B65H 75/44* (2006.01)

(52) U.S. Cl.
CPC ....... *H04N 23/555* (2023.01); *B65H 75/4442* (2013.01); *B65H 75/4471* (2013.01)

(58) Field of Classification Search
None
See application file for complete search history.

(56) References Cited

FOREIGN PATENT DOCUMENTS

| WO | 20140145778 A1 | 9/2014 |
| WO | 20180112411 A1 | 6/2018 |
| WO | WO2018/112411 | * 6/2018 |

OTHER PUBLICATIONS

International Searching Authority, "Written Opinion of the International Searching Authority" for PCT Patent Application No. PCT/US2024/034619, Sep. 20, 2024, European Patent Office, Munich.

* cited by examiner

*Primary Examiner* — Christopher Braniff
(74) *Attorney, Agent, or Firm* — Steven C. Tietsworth, Esq.; Michael J. Pennington, Esq.

(57) ABSTRACT

A pipe inspection system includes a cable storage drum and a housing configured to removably receive and rotatably support the cable storage drum. A push-cable with a plurality of conductors is stored in the drum. An inspection camera may be attached to a distal end of the push-cable. The drum includes a hollow core outer cone configured to accept an inner core removable module. The removable module may include electrical, mechanical, wireless, satellite, and power/battery interfaces. The module mates with a contact plate sealed inside the inner cone. The inner core components, including the battery module, are stationary relative to the inner core. The inner core is free to rotate bidirectionally inside the outer cone as the camera is being fed into, and out of a pipe or conduit for inspection. Slip-rings are not required to maintain connectivity because the electronics and battery module are stationary relative to each other.

37 Claims, 15 Drawing Sheets

INNER DRUM MODULE WITH PUSH-CABLE INTERFACE FOR PIPE INSPECTION

CROSS-REFERENCE TO RELATED APPLICATIONS

This application claims priority under 35 U.S.C. § 119(e) to U.S. Provisional Patent Application Ser. No. 63/510,014 entitled INNER DRUM MODULE WITH PUSH-CABLE INTERFACE FOR PIPE INSPECTION, filed on Jun. 23, 2023, the content of which is hereby incorporated by reference herein in its entirety for all purposes.

FIELD

This disclosure relates generally to pipe inspection systems employing a camera head connected to the end of a push-cable payed out from a rotatable cable drum. More specifically, but not exclusively, this disclosure relates to a cable storage drum with a removable module for housing electronics and other components, including a battery module interface. The cable storage drum does not require any slip-rings to maintain connectivity between the battery module interface and the electronics.

BACKGROUND

FIG. 1 illustrates a pipe inspection system including a cable storage drum and a housing configured to removably receive and rotatably support the cable storage drum, as known in the prior art. The cable storage drum typically includes a drum-reel for deploying or retracting a push-cable or hose into, or out of, a pipe or conduit to be inspected. A camera head or other inspection equipment may be operatively connected to a distal end of the push-cable.

The drum-reel is typically free to rotate bidirectionally around an inner hub which is stationary. The hub may be secured to a frame. The hub may be configured to house a power source such as a battery module, and other components, either electrical or mechanical. Electrical connectivity between the cable and the hub components is accomplished via one or more slip-rings which allow connectivity to be maintained even while the cable-drum is rotating. Slip-rings do not always provide perfect electrical connectivity, require maintenance, and may be subject to failure.

Accordingly, the present invention is directed towards addressing the above-described problems and other problems associated with quickly and accurately obtaining and processing accurate utility location data.

SUMMARY

This disclosure relates generally to pipe inspection systems employing a camera head connected to the end of a push-cable payed out from a rotatable cable drum. More specifically, but not exclusively, this disclosure relates to a cable storage drum with a removable module for housing electronics and other components, including a battery module interface. The cable storage drum does not require any slip-rings to maintain connectivity between the battery module interface and the electronics.

In one aspect, the present disclosure relates to a modular drum assembly with an inner core module which mates with a substantially hollow core outer cone removably attachable to a cable storage drum. The inner core module provides a housing for various component interfaces. With multiple component interfaces it provides the ability to quickly swap out batteries, add or remove different electrical and mechanical components, e.g. wireless and satellite positioning components, cable reel counters, sensor components, etc., greatly reduces inspection downtime, and improves the type and quality of captured inspection images and other data. A latching, locking, or other quick release connection mechanism may be provided to secure the inner core module with the outer cone.

In another aspect, a modular drum assembly includes an inner core module which is removably attachable to an outer cone. The inner core module and the outer cone which are shaped to mate and lock together. The outer cone is removably attachable to a cable storage drum. Once attached, the modular drum assembly and the cable storage drum remain stationary relative to each other, thereby allowing both the modular drum assembly and the cable storage drum to rotate bidirectionally around a common hub. Since the cable storage drum and the modular drum assembly move in unison, the electrical and mechanical components inside the inner hub also move at the same time. Since connectivity to any inner hub components is constant, and independent from any rotation of the cable storage drum, the need for any slip-rings to maintain connectivity between components that do not move together is eliminated. This provides more reliable communication of captured images and data, and therefore, a more robust and reliable utility pipe or conduit inspection system. The outer cone may include an aperture for providing front-side access to the inner core module.

In another aspect, the hollow inner core is configured as a cartridge that can be plugged into the outer cone. When connected together, the inner core mates (makes contact) with a contact plate that is sealed inside the outside cone. The cartridge is hollow with multiple interfaces for connecting to various electrical and mechanical components, including one or both of wireless or satellite positioning modules or components (e.g. WiFi, GPS, GNSS, Bluetooth, antennas, receivers, transmitter, transceivers, reel counters, sensors, battery modules and components, etc.).

On the opposite side of the inner core, the contact plate can be attached to a push-cable. The push-cable includes electrical contacts which may be attached to a camera at the distal end of the push-cable. The camera may be a digital self-leveling camera. Examples of a push-cable and video push cable system configurations are described in the following incorporated United States Patents and Patent applications may be used in conjunction with the disclosure herein in various embodiments. The incorporated patents and patent applications include co-assigned U.S. Pat. No. 6,958,767, entitled VIDEO PIPE INSPECTION SYSTEM EMPLOYING NON-ROTATING CABLE STORAGE DRUM, issued Oct. 25, 2005, U.S. Pat. No. 6,862,945, entitled CAMERA GUIDE FOR VIDEO PIPE INSPECTION SYSTEM, issued Mar. 8, 2005, U.S. Pat. No. 6,545,704, entitled VIDEO PIPE INSPECTION DISTANCE MEASURING SYSTEM, issued Apr. 8, 2003, U.S. Pat. No. 5,939,679, entitled VIDEO PUSH-CABLE, issued Aug. 17, 1999, U.S. Pat. No. 5,808,239, entitled VIDEO PUSH-CABLE, issued Sep. 15, 1998, U.S. Pat. No. 5,457,288, entitled DUAL PUSH-CABLE FOR PIPE INSPECTION, issued Oct. 10, 1995, U.S. patent application Ser. No. 13/346,668, entitled PORTABLE CAMERA CONTROLLER PLATFORM FOR USE WITH PIPE INSPECTION SYSTEM, filed Jan. 1, 2012, U.S. Provisional Patent Application Ser. No. 61/559,107, entitled PORTABLE PIPE INSPECTION SYSTEMS & APPARATUS, filed Nov. 13, 2011, U.S. patent application Ser. No. 13/214,208, entitled ASYMMETRIC DRAG FORCE BEARINGS FOR USE WITH PUSH-CABLE, filed Aug. 21, 2011, U.S. patent application Ser. No. 13/073,919, entitled PIPE INSPECTION SYSTEM WITH JETTER PUSH-CABLE, filed Mar. 16, 2011, U.S. patent application Ser. No. 12/766,742, entitled PIPE INSPECTION CABLE COUNTER AND OVERLAY MANAGEMENT SYSTEM, filed Apr. 23, 2010, U.S. patent application Ser. No. 12/658,939, entitled SNAP ON PIPE GUIDE, filed Feb. 16, 2010, U.S. patent application Ser. No. 12/704,808, entitled PIPE INSPECTION SYSTEM WITH REPLACEABLE CABLE STORAGE DRUM, filed Feb. 12, 2010, U.S. patent application Ser. No. 12/399,859, entitled PIPE INSPECTION SYSTEM WITH SELECTIVE IMAGE CAPTURE, filed Mar. 6, 2009, U.S. patent application Ser. No. 12/371,540, entitled PUSH-CABLES FOR PIPE INSPECTION SYSTEM, filed Feb. 13, 2009, U.S. patent application Ser. No. 11/928,818, entitled PIPE MAPPING SYSTEM, filed Oct. 30, 2007, U.S. patent application Ser. No. 11/774,462, filed Jul. 6, 2007, U.S. patent application Ser. No. 11/679,092, entitled LIGHT WEIGHT SEWER CABLE, filed Feb. 26, 2007. The content of each of these applications is incorporated by reference herein in its entirety.

In one aspect, the inner core module includes a plurality of component interfaces for electrical or mechanical components, or both. A battery module interface provides connectivity for multiple battery types and brands. The battery module interface may be replaced with other battery module interfaces to provide additional connectivity to additional battery sizes and types.

In another aspect, the interface between the cable storage drum and the outer cone is rotation module. The rotation module may include various bearing configurations. As an example, the rotation module may include a set of front bearings, and a set of rear bearings. The rear bearings may be physically larger that the set of front bearings in order to provide removable access of the battery interface module. The set of front bearings and set of rear bearings may be partially enclosed by a clamshell assembly housing including a first half clamshell enclosure and a second half clamshell enclosure which are removably attachable to each other.

In another aspect, the inner core module may include a wireless transmit antenna positioned relatively front and center along the rotation axis of the cable storage drum all the way forward to roughly the line of the small bearing set front side where the camera exits.

In another aspect, the cable storage drum may include various accessories. For instance, one or more cable guides, including a cable locking mechanism, may be provided. The cable guides may include foil steel loops/coils. Also, one or more handles may be provided to facilitate removal and insertion of the inner core (hub) into and out of the outer cone. The inner core (hub) is completely removable to allow access to, or removal of the drum.

In another aspect, the inner core hub may be cone shaped. The inner core hub may include space, as well as interface connections for various electronics including but not limited to wireless communication electronics, cable counters, GNSS and other types of satellite positioning electronics (e.g. transmitters, receivers, transceivers, antennas, etc.), power electronics including a battery module interface, and image processing electronics including various types of processors, and memory. One skilled in the art would recognize that other electrical and mechanical systems and components related to utility camera inspection and/or communications could also be located inside the inner core hub.

Various additional aspects, features, and functions are described below in conjunction with the Drawings.

Details of example devices, systems, and methods that may be combined with the embodiments disclosed herein, as well as additional components, methods, and configurations that may be used in conjunction with the embodiments described herein, are disclosed in co-assigned patents and patent applications including: U.S. Pat. No. 7,009,399, issued Mar. 7, 2006, entitled OMNIDIRECTIONAL SONDE AND LINE LOCATOR; U.S. Pat. No. 7,136,765, issued Nov. 14, 2006, entitled A BURIED OBJECT LOCATING AND TRACING METHOD AND SYSTEM EMPLOYING PRINCIPAL COMPONENTS ANALYSIS FOR BLIND SIGNAL DETECTION; U.S. Pat. No. 7,221,136, issued May 22, 2007, entitled SONDES FOR LOCATING UNDERGROUND PIPES AND CONDUITS; U.S. Pat. No. 7,276,910, issued Oct. 2, 2007, entitled A COMPACT SELF-TUNED ELECTRICAL RESONATOR FOR BURIED OBJECT LOCATOR APPLICATIONS; U.S. Pat. No. 7,288,929, issued Oct. 30, 2007, entitled INDUCTIVE CLAMP FOR APPLYING SIGNAL TO BURIED UTILITIES; U.S. Pat. No. 7,298,126, issued Nov. 20, 2007, entitled SONDES FOR LOCATING UNDERGROUND PIPES AND CONDUITS; U.S. Pat. No. 7,332,901, issued Feb. 19, 2008, entitled LOCATOR WITH APPARENT DEPTH INDICATION; U.S. Pat. No. 7,443,154, issued Oct. 28, 2008, entitled MULTI-SENSOR MAPPING OMNIDIRECTIONAL SONDE AND LINE LOCATOR; U.S. Pat. No. 7,498,797, issued Mar. 3, 2009, entitled LOCATOR WITH CURRENT-MEASURING CAPABILITY; U.S. Pat. No. 7,498,816, issued Mar. 3, 2009, entitled OMNIDIRECTIONAL SONDE AND LINE LOCATOR; U.S. Pat. No. 7,336,078, issued Feb. 26, 2008, entitled MULTI-SENSOR MAPPING OMNIDIRECTIONAL SONDE AND LINE LOCATORS; U.S. Pat. No. 7,518,374, issued Apr. 14, 2009, entitled RECONFIGURABLE PORTABLE LOCATOR EMPLOYING MULTIPLE SENSOR ARRAYS HAVING FLEXIBLE NESTED ORTHOGONAL ANTENNAS; U.S. Pat. No. 7,557,559, issued Jul. 7, 2009, entitled COMPACT LINE ILLUMINATOR FOR BURIED PIPES AND CABLES; U.S. Pat. No. 7,619,516, issued Nov. 17, 2009, entitled SINGLE AND MULTI-TRACE OMNIDIRECTIONAL SONDE AND LINE LOCATORS AND TRANSMITTER USED THEREWITH; U.S. Pat. No. 7,619,516, issued Nov. 17, 2009, entitled SINGLE AND MULTI-TRACE OMNIDIRECTIONAL SONDE AND LINE LOCATORS AND TRANSMITTER USED THEREWITH; U.S. Pat. No. 7,733,077, issued Jun. 8, 2010, entitled MULTI-SENSOR MAPPING OMNIDIRECTIONAL SONDE AND LINE LOCATORS AND TRANSMITTER USED THEREWITH; U.S. Pat. No. 7,741,848, issued Jun. 22, 2010, entitled ADAPTIVE MULTICHANNEL LOCATOR SYSTEM FOR MULTIPLE PROXIMITY DETECTION; U.S. Pat. No. 7,755,360, issued Jul. 13, 2010, entitled PORTABLE LOCATOR SYSTEM WITH JAMMING REDUCTION; U.S. Pat. No. 7,825,647, issued Nov. 2, 2010, entitled METHOD FOR LOCATING BURIED PIPES AND CABLES; U.S. Pat. No. 7,830,149, issued Nov. 9, 2010, entitled AN UNDERGROUND UTILITY LOCATOR WITH A TRANSMITTER, A PAIR OF UPWARDLY OPENING POCKET AND HELICAL COIL TYPE ELECTRICAL CORDS; U.S. Pat. No. 7,864,980, issued Jan. 4, 2011, entitled SONDES FOR LOCATING UNDERGROUND PIPES AND CONDUITS; U.S. Pat. No. 7,948,236, issued May 24, 2011, entitled ADAPTIVE MULTICHANNEL LOCATOR SYSTEM FOR MULTIPLE PROXIMITY DETECTION; U.S. Pat. No. 7,969,151, issued Jun. 28, 2011, entitled PRE-AMPLIFIER AND MIXER CIRCUITRY FOR A LOCATOR ANTENNA; U.S. Pat. No. 7,990,151, issued Aug. 2, 2011, entitled TRI-POD BURIED LOCATOR SYSTEM; U.S. Pat. No. 8,013,610, issued Sep. 6, 2011, entitled HIGH Q SELF-TUNING LOCATING TRANSMITTER; U.S. Pat. No. 8,035,390, issued Oct. 11, 2011, entitled OMNIDIRECTIONAL SONDE AND LINE LOCATOR; U.S. Pat. No. 8,106,660, issued Jan. 31, 2012, entitled SONDE ARRAY FOR USE WITH BURIED LINE LOCATOR; U.S. Pat. No. 8,203,343, issued Jun. 19, 2012, entitled RECONFIGURABLE PORTABLE LOCATOR EMPLOYING MULTIPLE SENSOR ARRAYS HAVING FLEXIBLE NESTED ORTHOGONAL ANTENNAS; U.S. Pat. No. 8,264,226, issued Sep. 11, 2012, entitled SYSTEM AND METHOD FOR LOCATING BURIED PIPES AND CABLES WITH A MAN PORTABLE LOCATOR AND A TRANSMITTER IN A MESH NETWORK; U.S. Pat. No. 8,248,056, issued Aug. 21, 2012, entitled A BURIED OBJECT LOCATOR SYSTEM EMPLOYING AUTOMATED VIRTUAL DEPTH EVENT DETECTION AND SIGNALING; U.S. patent application Ser. No. 13/769,202, filed Feb. 15, 2013, entitled SMART PAINT STICK DEVICES AND METHODS; U.S. patent application Ser. No. 13/793,168, filed Mar. 11, 2013, entitled BURIED OBJECT LOCATORS WITH CONDUCTIVE ANTENNA BOBBINS; U.S. Pat. No. 8,400,154, issued Mar. 19, 2013, entitled LOCATOR ANTENNA WITH CONDUCTIVE BOBBIN; U.S. patent application Ser. No. 14/027,027, filed Sep. 13, 2013, entitled SONDE DEVICES INCLUDING A SECTIONAL FERRITE CORE STRUCTURE; U.S. patent application Ser. No. 14/033,349, filed Sep. 20, 2013, entitled AN UNDERGROUND UTILITY LOCATOR WITH A TRANSMITTER, A PAIR OF UPWARDLY OPENING POCKET AND HELICAL COIL TYPE ELECTRICAL CORDS; U.S. Pat. No. 8,547,428, issued Oct. 1, 2013, entitled PIPE MAPPING SYSTEM; U.S. Pat. No. 8,564,295, issued Oct. 22, 2013, entitled METHOD FOR SIMULTANEOUSLY DETERMINING A PLURALITY OF DIFFERENT LOCATIONS OF THE BURIED OBJECTS AND SIMULTANEOUSLY INDICATING THE DIFFERENT LOCATIONS TO A USER; U.S. patent application Ser. No. 14/148,649, filed Jan. 6, 2014, entitled MAPPING LOCATING SYSTEMS & METHODS; U.S. Pat. No. 8,635,043, issued Jan. 21, 2014, entitled LOCATOR AND TRANSMITTER CALIBRATION SYSTEM; U.S. Pat. No. 8,717,028, issued May 6, 2014, entitled SPRING CLIPS FOR USE WITH LOCATING TRANSMITTERS; U.S. Pat. No. 8,773,133, issued Jul. 8, 2014, entitled ADAPTIVE MULTICHANNEL LOCATOR SYSTEM FOR MULTIPLE PROXIMITY DETECTION; U.S. Pat. No. 8,841,912, issued Sep. 23, 2014, entitled PRE-AMPLIFIER AND MIXER CIRCUITRY FOR A LOCATOR ANTENNA; U.S. Pat. No. 9,041,794, issued May 26, 2015, entitled PIPE MAPPING SYSTEMS AND METHODS; U.S. Pat. No. 9,057,754, issued Jun. 16, 2015, entitled ECONOMICAL MAGNETIC LOCATOR APPARATUS AND METHOD; U.S. Pat. No. 9,081,109, issued Jul. 14, 2015, entitled GROUND-TRACKING DEVICES FOR USE WITH A MAPPING LOCATOR; U.S. Pat. No. 9,082,269, issued Jul. 14, 2015, entitled HAPTIC DIRECTIONAL FEEDBACK HANDLES FOR LOCATION DEVICES; U.S. Pat. No. 9,085,007, issued Jul. 21, 2015, entitled MARKING PAINT APPLICATOR FOR PORTABLE LOCATOR; U.S. Pat. No. 9,207,350, issued Dec. 8, 2015, entitled BURIED OBJECT LOCATOR APPARATUS WITH SAFETY LIGHTING ARRAY; U.S. Pat. No. 9,341,740, issued May 17, 2016, entitled OPTICAL GROUND TRACKING APPARATUS, SYSTEMS, AND METHODS; U.S. Pat. No. 9,372,117, issued Jun. 21, 2016, entitled OPTICAL GROUND TRACKING APPARATUS, SYSTEMS, AND METHODS; U.S. patent application Ser. No. 15/187,785, filed Jun. 21, 2016, entitled BURIED UTILITY LOCATOR GROUND TRACKING APPARATUS, SYSTEMS, AND METHODS; U.S. Pat. No. 9,411,066, issued Aug. 9, 2016, entitled SONDES & METHODS FOR USE WITH BURIED LINE LOCATOR SYSTEMS; U.S. Pat. No. 9,411,067, issued Aug. 9, 2016, entitled GROUND-TRACKING SYSTEMS AND APPARATUS; U.S. Pat. No. 9,435,907, issued Sep. 6, 2016, entitled PHASE SYNCHRONIZED BURIED OBJECT LOCATOR APPARATUS, SYSTEMS, AND METHODS; U.S. Pat. No. 9,465,129, issued Oct. 11, 2016, entitled IMAGE-BASED MAPPING LOCATING SYSTEM; U.S. Pat. No. 9,488,747, issued Nov. 8, 2016, entitled GRADIENT ANTENNA COILS AND ARRAYS FOR USE IN LOCATING SYSTEM; U.S. Pat. No. 9,494,706, issued Nov. 15, 2016, entitled OMNI-INDUCER TRANSMITTING DEVICES AND METHODS; U.S. Pat. No. 9,523,788, issued Dec. 20, 2016, entitled MAGNETIC SENSING BURIED OBJECT LOCATOR INCLUDING A CAMERA; U.S. Pat. No. 9,571,326, issued Feb. 14, 2017, entitled METHOD AND APPARATUS FOR HIGH-SPEED DATA TRANSFER EMPLOYING SELF-SYNCHRONIZING QUADRATURE AMPLITUDE MODULATION (QAM); U.S. Pat. No. 9,599,449, issued Mar. 21, 2017, entitled SYSTEMS AND METHODS FOR LOCATING BURIED OR HIDDEN OBJECTS USING SHEET CURRENT FLOW MODELS; U.S. Pat. No. 9,599,740, issued Mar. 21, 2017, entitled USER INTERFACES FOR UTILITY LOCATORS; U.S. Pat. No. 9,625,602, issued Apr. 18, 2017, entitled SMART PERSONAL COMMUNICATION DEVICES AS USER INTERFACES; U.S. Pat. No. 9,632,202, issued Apr. 25, 2017, entitled ECONOMICAL MAGNETIC LOCATOR APPARATUS AND METHODS; U.S. Pat. No. 9,634,878, issued Apr. 25, 2017, entitled SYSTEMS AND METHODS FOR DATA TRANSFER USING SELF-SYNCHRONIZING QUADRATURE AMPLITUDE MODULATION (QAM); United States Patent Application, filed Apr. 25, 2017, entitled SYSTEMS AND METHODS FOR LOCATING AND/OR MAPPING BURIED UTILITIES USING VEHICLE-MOUNTED LOCATING DEVICES; U.S. Pat. No. 9,638,824, issued May 2, 2017, entitled QUAD-GRADIENT COILS FOR USE IN LOCATING SYSTEMS; United States Patent Application, filed May 9, 2017, entitled BORING INSPECTION SYSTEMS AND METHODS; U.S. Pat. No. 9,651,711, issued May 16, 2017, entitled HORIZONTAL BORING INSPECTION DEVICE AND METHODS; U.S. Pat. No. 9,684,090, issued Jun. 20, 2017, entitled NULLED-SIGNAL LOCATING DEVICES, SYSTEMS, AND METHODS; U.S. Pat. No. 9,696,447, issued Jul. 4, 2017, entitled BURIED OBJECT LOCATING METHODS AND APPARATUS USING MULTIPLE ELECTROMAGNETIC SIGNALS; U.S. Pat. No. 9,696,448, issued Jul. 4, 2017, entitled GROUND-TRACKING DEVICES AND METHODS FOR USE WITH A UTILITY LOCATOR; U.S. Pat. No. 9,703,002, issued Jun. 11, 2017, entitled UTILITY LOCATOR SYSTEMS & METHODS; U.S. patent application Ser. No. 15/670,845, filed Aug. 7, 2016, entitled HIGH FREQUENCY AC-POWERED DRAIN CLEANING AND INSPECTION APPARATUS & METHODS; U.S. patent application Ser. No. 15/681,250, filed Aug. 18, 2017, entitled ELECTRONIC MARKER DEVICES AND SYSTEMS; U.S. patent application Ser. No. 15/681,409, filed Aug. 20, 2017, entitled WIRELESS BURIED PIPE & CABLE LOCATING SYSTEMS; U.S. Pat. No. 9,746,572, issued Aug. 29, 2017, entitled ELECTRONIC MARKER DEVICES AND SYSTEMS; U.S. Pat. No. 9,746,573, issued Aug. 29, 2017, entitled WIRELESS BURIED PIPE AND CABLE LOCATING SYSTEMS; U.S. Pat. No. 9,784,837, issued Oct. 10, 2017, entitled OPTICAL GROUND TRACKING APPARATUS, SYSTEMS & METHODS; U.S. patent application Ser. No. 15/811,361, filed Nov. 13, 2017, entitled OPTICAL GROUND-TRACKING APPARATUS, SYSTEMS, AND METHODS; U.S. Pat. No. 9,841,503, issued Dec. 12, 2017, entitled OPTICAL GROUND-TRACKING APPARATUS, SYSTEMS, AND METHODS; U.S. patent application Ser. No. 15/846,102, filed Dec. 18, 2017, entitled SYSTEMS AND METHOD FOR ELECTRONICALLY MARKING, LOCATING AND VIRTUALLY DISPLAYING BURIED UTILITIES; U.S. patent application Ser. No. 15/866,360, filed Jan. 9, 2018, entitled TRACKED DISTANCE MEASURING DEVICES, SYSTEMS, AND METHODS; U.S. Pat. No. 9,891,337, issued Feb. 13, 2018, entitled UTILITY LOCATOR TRANSMITTER DEVICES, SYSTEMS, and METHODS WITH DOCKABLE APPARATUS; U.S. Pat. No. 9,914,157, issued Mar. 13, 2018, entitled METHODS AND APPARATUS FOR CLEARING OBSTRUCTIONS WITH A JETTER PUSH-CABLE APPARATUS; U.S. patent application Ser. No. 15/925,643, issued Mar. 19, 2018, entitled PHASE-SYNCHRONIZED BURIED OBJECT TRANSMITTER AND LOCATOR METHODS AND APPARATUS; U.S. patent application Ser. No. 15/925,671, issued Mar. 19, 2018, entitled MULTI-FREQUENCY LOCATING SYSTEMS AND METHODS; U.S. patent application Ser. No. 15/936,250, filed Mar. 26, 208, entitled GROUND TRACKING APPARATUS, SYSTEMS, AND METHODS; U.S. Pat. No. 9,927,545, issued Mar. 27, 2018, entitled MULTI-FREQUENCY LOCATING SYSTEMS & METHODS; U.S. Pat. No. 9,928,613, issued Mar. 27, 2018, entitled GROUND TRACKING APPARATUS, SYSTEMS, AND METHODS; U.S. patent application Ser. No. 15/250,666, filed Mar. 27, 2018, entitled PHASE-SYNCHRONIZED BURIED OBJECT TRANSMITTER AND LOCATOR METHODS AND APPARATUS; U.S. Pat. No. 9,880,309, issued Mar. 28, 2018, entitled UTILITY LOCATOR TRANSMITTER APPARATUS & METHODS; U.S. patent application Ser. No. 15/954,486, filed Apr. 16, 2018, entitled UTILITY LOCATOR APPARATUS, SYSTEMS, AND METHODS; U.S. Pat. No. 9,945,976, issued Apr. 17, 2018, entitled UTILITY LOCATOR APPARATUS, SYSTEMS, AND METHODS; U.S. Pat. No. 9,989,662, issued Jun. 5, 2018, entitled BURIED OBJECT LOCATING DEVICE WITH A PLURALITY OF SPHERICAL SENSOR BALLS THAT INCLUDE A PLURALITY OF ORTHOGONAL ANTENNAE; U.S. patent application Ser. No. 16/036,713, issued Jul. 16, 2018, entitled UTILITY LOCATOR APPARATUS AND SYSTEMS; U.S. Pat. No. 10,024,994, issued Jul. 17, 2018, entitled WEARABLE MAGNETIC FIELD UTILITY LOCATOR SYSTEM WITH SOUND FIELD GENERATION; U.S. Pat. No. 10,031,253, issued Jul. 24, 2018, entitled GRADIENT ANTENNA COILS AND ARRAYS FOR USE IN LOCATING SYSTEMS; U.S. Pat. No. 10,042,072, issued Aug. 7, 2018, entitled OMNI-INDUCER TRANSMITTING DEVICES AND METHODS; U.S. Pat. No. 10,059,504, issued Aug. 28, 2018, entitled MARKING PAINT APPLICATOR FOR USE WITH PORTABLE UTILITY LOCATOR; U.S. patent application Ser. No. 16/049,699, filed Jul. 30, 2018, entitled OMNI-INDUCER TRANSMITTING DEVICES AND METHODS; U.S. Pat. No. 10,069,667, issued Sep. 4, 2018, entitled SYSTEMS AND METHODS FOR DATA TRANSFER USING SELF-SYNCHRONIZING QUADRATURE AMPLITUDE MODULATION (QAM); U.S. patent application Ser. No. 16/121,379, filed Sep. 4, 2018, entitled KEYED CURRENT SIGNAL UTILITY LOCATING SYSTEMS AND METHODS; U.S. patent application Ser. No. 16/125,768, filed Sep. 10, 2018, entitled BURIED OBJECT LOCATOR APPARATUS AND METHODS; U.S. Pat. No. 10,073,186, issued Sep. 11, 2018, entitled KEYED CURRENT SIGNAL UTILITY LOCATING SYSTEMS AND METHODS; U.S. patent application Ser. No. 16/133,642, issued Sep. 17, 2018, entitled MAGNETIC UTILITY LOCATOR DEVICES AND METHODS; U.S. Pat. No. 10,078,149, issued Sep. 18, 2018, entitled BURIED OBJECT LOCATORS WITH DODECAHEDRAL ANTENNA NODES; U.S. Pat. No. 10,082,591, issued Sep. 25, 2018, entitled MAGNETIC UTILITY LOCATOR DEVICES & METHODS; U.S. Pat. No. 10,082,599, issued Sep. 25, 2018, entitled MAGNETIC SENSING BURIED OBJECT LOCATOR INCLUDING A CAMERA; U.S. Pat. No. 10,090,498, issued Oct. 2, 2018, entitled MODULAR BATTERY PACK APPARATUS, SYSTEMS, AND METHODS INCLUDING VIRAL DATA AND/OR CODE TRANSFER; U.S. patent application Ser. No. 16/160,874, filed Oct. 15, 2018, entitled TRACKABLE DIPOLE DEVICES, METHODS, AND SYSTEMS FOR USE WITH MARKING PAINT STICKS; U.S. patent application Ser. No. 16/222,994, filed Dec. 17, 2018, entitled UTILITY LOCATORS WITH RETRACTABLE SUPPORT STRUCTURES AND APPLICATIONS THEREOF; U.S. Pat. No. 10,105,723, issued Oct. 23, 2018, entitled TRACKABLE DIPOLE DEVICES, METHODS, AND SYSTEMS FOR USE WITH MARKING PAINT STICKS; U.S. Pat. No. 10,162,074, issued Dec. 25, 2018, entitled UTILITY LOCATORS WITH RETRACTABLE SUPPORT STRUCTURES AND APPLICATIONS THEREOF; U.S. patent application Ser. No. 16/241,864, filed Jan. 7, 2019, entitled TRACKED DISTANCE MEASURING DEVICES, SYSTEMS, AND METHODS; U.S. patent application Ser. No. 16/255,524, filed Jan. 23, 2019, entitled RECHARGEABLE BATTERY PACK ONBOARD CHARGE STATE INDICATION METHODS AND APPARATUS; U.S. Pat. No. 10,247,845, issued Apr. 2, 2019, entitled UTILITY LOCATOR TRANSMITTER APPARATUS AND METHODS; U.S. patent application Ser. No. 16/382,136, filed Apr. 11, 2019, entitled GEOGRAPHIC MAP UPDATING METHODS AND SYSTEMS; U.S. Pat. No. 10,274,632, issued Apr. 20, 2019, entitled UTILITY LOCATING SYSTEMS WITH MOBILE BASE STATION; U.S. patent application Ser. No. 16/390,967, filed Apr. 22, 2019, entitled UTILITY LOCATING SYSTEMS WITH MOBILE BASE STATION; U.S. patent application Ser. No. 29/692,937, filed May 29, 2019, entitled BURIED OBJECT LOCATOR; U.S. patent application Ser. No. 16/436,903, filed Jun. 10, 2019, entitled OPTICAL GROUND TRACKING APPARATUS, SYSTEMS, AND METHODS FOR USE WITH BURIED UTILITY LOCATORS; U.S. Pat. No. 10,317,559, issued Jun. 11, 2019, entitled GROUND-TRACKING DEVICES AND METHODS FOR USE WITH A UTILITY LOCATOR; U.S. patent application Ser. No. 16/449,187, filed Jun. 21, 2019, entitled ELECTROMAGNETIC MARKER DEVICES FOR BURIED OR HIDDEN USE; U.S. patent application Ser. No. 16/455,491, filed Jun. 27, 2019, entitled SELF-STANDING MULTI-LEG ATTACHMENT DEVICES FOR USE WITH UTILITY LOCATORS; U.S. Pat. No. 10,353,103, issued Jul. 16, 2019, entitled SELF-STANDING MULTI-LEG ATTACHMENT DEVICES FOR USE WITH UTILITY LOCATORS; U.S. patent application Ser. No. 16/551,653, filed Aug. 26, 2019, entitled BURIED UTILITY MARKER DEVICES, SYSTEMS, AND METHODS; U.S. Pat. No. 10,401,526, issued Sep. 3, 2019, entitled BURIED UTILITY MARKER DEVICES, SYSTEMS, AND METHODS; U.S. Pat. No. 10,324,188, issued Oct. 9, 2019, entitled OPTICAL GROUND TRACKING APPARATUS, SYSTEMS, AND METHODS FOR USE WITH BURIED UTILITY LOCATORS; U.S. patent application Ser. No. 16/446,456, filed Jun. 19, 2019, entitled DOCKABLE TRIPODAL CAMERA CONTROL UNIT; U.S. patent application Ser. No. 16/520,248, filed Jul. 23, 2019, entitled MODULAR BATTERY PACK APPARATUS, SYSTEMS, AND METHODS; U.S. Pat. No. 10,371,305, issued Aug. 6, 2019, entitled DOCKABLE TRIPODAL CAMERA CONTROL UNIT; U.S. Pat. No. 10,490,908, issued Nov. 26, 2019, entitled DUAL ANTENNA SYSTEMS WITH VARIABLE POLARIZATION; U.S. patent application Ser. No. 16/701,085, filed Dec. 2, 2019, entitled MAP GENERATION BASED ON UTILITY LINE POSITION AND ORIENTATION ESTIMATES; U.S. Pat. No. 10,534,105, issued Jan. 14, 2020, entitled UTILITY LOCATING TRANSMITTER APPARATUS AND METHODS; U.S. patent application Ser. No. 16/773,952, filed Jan. 27, 2020, entitled MAGNETIC FIELD CANCELING AUDIO DEVICES; U.S. patent application Ser. No. 16/780,813, filed Feb. 3, 2020, entitled RESILIENTLY DEFORMABLE MAGNETIC FIELD CORE APPARATUS AND APPLICATIONS; U.S. Pat. No. 10,555,086, issued Feb. 4, 2020, entitled MAGNETIC FIELD CANCELING AUDIO SPEAKERS FOR USE WITH BURIED UTILITY LOCATORS OR OTHER DEVICES; U.S. patent application Ser. No. 16/786,935, filed Feb. 10, 2020, entitled SYSTEMS AND METHODS FOR UNIQUELY IDENTIFYING BURIED UTILITIES IN A MULTI-UTILITY ENVIRONMENT; U.S. Pat. No. 10,557,824, issued Feb. 11, 2020, entitled RESILIENTLY DEFORMABLE MAGNETIC FIELD TRANSMITTER CORES FOR USE WITH UTILITY LOCATING DEVICES AND SYSTEMS; U.S. patent application Ser. No. 16/791,979, issued Feb. 14, 2020, entitled MARKING PAINT APPLICATOR APPARATUS; U.S. patent application Ser. No. 16/792,047, filed Feb. 14, 2020, entitled SATELLITE AND MAGNETIC FIELD SONDE APPARATUS AND METHODS; U.S. Pat. No. 10,564,309, issued Feb. 18, 2020, entitled SYSTEMS AND METHODS FOR UNIQUELY IDENTIFYING BURIED UTILITIES IN A MULTI-UTILITY ENVIRONMENT; U.S. Pat. No. 10,571,594, issued Feb. 25, 2020, entitled UTILITY LOCATOR DEVICES, SYSTEMS, AND METHODS WITH SATELLITE AND MAGNETIC FIELD SONDE ANTENNA SYSTEMS; U.S. Pat. No. 10,569,952, issued Feb. 25, 2020, entitled MARKING PAINT APPLICATOR FOR USE WITH PORTABLE UTILITY LOCATOR; U.S. patent application Ser. No. 16/810,788, filed Mar. 5, 2019, entitled MAGNETICALLY RETAINED DEVICE HANDLES; U.S. patent application Ser. No. 16/827,672, filed Mar. 23, 2020, entitled DUAL ANTENNA SYSTEMS WITH VARIABLE POLARIZATION; U.S. patent application Ser. No. 16/833,426, filed Mar. 27, 2020, entitled LOW COST, HIGH PERFORMANCE SIGNAL PROCESSING IN A MAGNETIC-FIELD SENSING BURIED UTILITY LOCATOR SYSTEM; U.S. Pat. No. 10,608,348, issued Mar. 31, 2020, entitled DUAL ANTENNA SYSTEMS WITH VARIABLE POLARIZATION; U.S. patent application Ser. No. 16/837,923, filed Apr. 1, 2020, entitled MODULAR BATTERY PACK APPARATUS, SYSTEMS, AND METHODS INCLUDING VIRAL DATA AND/OR CODE TRANSFER; U.S. patent application Ser. No. 17/235,507, filed Apr. 20, 2021, entitled UTILITY LOCATING DEVICES EMPLOYING MULTIPLE SPACED APART GNSS ANTENNAS; U.S. Provisional Patent Application 63/015,692, filed Apr. 27, 2020, entitled SPATIALLY AND PROCESSING-BASED DIVERSE REDUNDANCY FOR RTK POSITIONING; U.S. patent application Ser. No. 16/872,362, filed May 11, 2020, entitled BURIED LOCATOR SYSTEMS AND METHODS; U.S. patent application Ser. No. 16/882,719, filed May 25, 2020, entitled UTILITY LOCATING SYSTEMS, DEVICES, AND METHODS USING RADIO BROADCAST SIGNALS; U.S. Pat. No. 10,670,766, issued Jun. 2, 2020, entitled UTILITY LOCATING SYSTEMS, DEVICES, AND METHODS USING RADIO BROADCAST SIGNALS; U.S. Pat. No. 10,677,820, issued Jun. 9, 2020, entitled BURIED LOCATOR SYSTEMS AND METHODS; U.S. patent application Ser. No. 16/902,245, filed Jun. 15, 2020, entitled LOCATING DEVICES, SYSTEMS, AND METHODS USING FREQUENCY SUITES FOR UTILITY DETECTION; U.S. patent application Ser. No. 16/902,249, filed Jun. 15, 2020, entitled USER INTERFACES FOR UTILITY LOCATORS; U.S. Pat. No. 10,690,795, issued Jun. 23, 2020, entitled LOCATING DEVICES, SYSTEMS, AND METHODS USING FREQUENCY SUITES FOR UTILITY DETECTION; U.S. patent application Ser. No. 16/908,625, filed Jun. 22, 2020, entitled ELECTROMAGNETIC MARKER DEVICES WITH SEPARATE RECEIVE AND TRANSMIT ANTENNA ELEMENTS; U.S. Pat. No. 10,690,796, issued Jun. 23, 2020, entitled USER INTERFACES FOR UTILITY LOCATORS; U.S. patent application Ser. No. 16/921,775, filed Jul. 6, 2020, entitled AUTO-TUNING CIRCUIT APPARATUS AND METHODS; U.S. Provisional Patent Application 63/055,278, filed Jul. 22, 2020, entitled VEHICLE-BASED UTILITY LOCATING USING PRINCIPAL COMPONENTS; U.S. patent application Ser. No. 16/995,801, filed Aug. 17, 2020, entitled UTILITY LOCATOR TRANSMITTER DEVICES, SYSTEMS, AND METHODS; U.S. patent application Ser. No. 17/001,200, filed Aug. 24, 2020, entitled MAGNETIC SENSING BURIED UTILITY LOCATOR INCLUDING A CAMERA; U.S. patent Ser. No. 16/995,793, filed Aug. 17, 2020, entitled UTILITY LOCATOR APPARATUS AND METHODS; U.S. Pat. No. 10,753,722, issued Aug. 25, 2020, entitled SYSTEMS AND METHODS FOR LOCATING BURIED OR HIDDEN OBJECTS USING SHEET CURRENT FLOW MODELS; U.S. Pat. No. 10,754,053, issued Aug. 25, 2020, entitled UTILITY LOCATOR TRANSMITTER DEVICES, SYSTEMS, AND METHODS WITH DOCKABLE APPARATUS; U.S. Pat. No. 10,761,233, issued Sep. 1, 2020, entitled SONDES AND METHODS FOR USE WITH BURIED LINE LOCATOR SYSTEMS; U.S. Pat. No. 10,761,239, issued Sep. 1, 2020, entitled MAGNETIC SENSING BURIED UTILITY LOCATOR INCLUDING A CAMERA; U.S. patent application Ser. No. 17/013,831, filed Sep. 7, 2020, entitled MULTIFUNCTION BURIED UTILITY LOCATING CLIPS; U.S. Pat. No. 10,777,919, issued Sep. 15, 2020, entitled MULTIFUNCTION BURIED UTILITY LOCATING CLIPS; U.S. patent application Ser. No. 17/020,487, filed Sep. 14, 2020, entitled ANTENNA SYSTEMS FOR CIRCULARLY POLARIZED RADIO SIGNALS; U.S. patent application Ser. No. 17/068,156, filed Oct. 12, 2020, entitled DUAL SENSED LOCATING SYSTEMS AND METHODS; U.S. Provisional Patent Application 63/091,67, filed Oct. 14, 2020, entitled ELECTRONIC MARKER-BASED NAVIGATION SYSTEMS AND METHODS FOR USE IN GNSS-DEPRIVED ENVIRONMENTS; U.S. Pat.

No. 10,809,408, issued Oct. 20, 2020, entitled DUAL SENSED LOCATING SYSTEMS AND METHODS; U.S. Pat. No. 10,845,497, issued Nov. 24, 2020, entitled PHASE-SYNCHRONIZED BURIED OBJECT TRANSMITTER AND LOCATOR METHODS AND APPARATUS; U.S. Pat. No. 10,859,727, issued Dec. 8, 2020, entitled ELECTRONIC MARKER DEVICES AND SYSTEMS; U.S. Pat. No. 10,908,311, issued Feb. 2, 2021, entitled SELF-STANDING MULTI-LEG ATTACHMENT DEVICES FOR USE WITH UTILITY LOCATORS; U.S. Pat. No. 10,928,538, issued Feb. 23, 2021, entitled KEYED CURRENT SIGNAL LOCATING SYSTEMS AND METHODS; U.S. Pat. No. 10,935,686, issued Mar. 2, 2021, entitled UTILITY LOCATING SYSTEM WITH MOBILE BASE STATION; and U.S. Pat. No. 10,955,583, issued Mar. 23, 2021, entitled BORING INSPECTION SYSTEMS AND METHODS; U.S. Pat. No. 10,983,239, issued Apr. 20, 2021, entitled MULTI-FREQUENCY LOCATING SYSTEMS AND METHODS; U.S. Pat. No. 10,983,240, issued Apr. 20, 2021, entitled MAGNETIC UTILITY LOCATOR DEVICE AND METHOD; U.S. Pat. No. 10,989,830, issued Apr. 27, 2021, entitled UTILITY LOCATOR APPARATUS AND SYSTEMS; U.S. Pat. No. 11,014,734, issued May 25, 2021, entitled MARKING PAINT APPLICATOR APPARATUS; U.S. Pat. No. 11,029,439, issued Jun. 8, 2021, entitled UTILITY LOCATOR APPARATUS, SYSTEMS, AND METHODS; U.S. Provisional Patent Application 63/212,713, filed Jun. 20, 2021, entitled DAYLIGHT VISIBLE AND MULTI-SPECTRAL LASER RANGEFINDERS AND ASSOCIATED METHODS AND UTILITY LOCATOR DEVICES; United States Patent D922,885, issued Jun. 22, 2021, entitled BURIED UTILITY LOCATOR; U.S. patent application Ser. No. 17/379,867, filed Jul. 19, 2021, entitled LOCATING DEVICES, SYSTEMS, AND METHODS USING FREQUENCY SUITES FOR UTILITY DETECTION; U.S. patent application Ser. No. 17/382,040, filed Jul. 21, 2021, entitled VEHICLE-BASED UTILITY LOCATING USING PRINCIPAL COMPONENTS; U.S. Pat. No. 11,073,632, issued Jul. 27, 2021, entitled LOCATING DEVICES, SYSTEMS, AND METHODS USING FREQUENCY SUITES FOR UTILITY DETECTION; U.S. Pat. No. 11,092,712, issued Aug. 17, 2021, entitled UTILITY LOCATING SYSTEMS, DEVICES, AND METHODS USING RADIO BROADCAST SIGNALS; U.S. patent application Ser. No. 17/461,833, filed Aug. 30, 2021, entitled COMBINED SATELLITE NAVIGATION AND RADIO TRANSCEIVER ANTENNA DEVICES; U.S. patent application Ser. No. 17/467,435, filed Sep. 6, 2021, entitled TRACKABLE DIPOLE DEVICES, METHODS, AND SYSTEMS FOR USE WITH MARKING PAINT STICKS; U.S. patent application Ser. No. 17/467,438, filed Sep. 6, 2021, entitled SATELLITE AND MAGNETIC FIELD SONDE APPARATUS AND METHODS; U.S. Pat. No. 11,137,513, issued Oct. 5, 2021, entitled INDUCTIVE CLAMP DEVICES, SYSTEMS, AND METHODS; U.S. Pat. No. 11,146,892, issued Oct. 12, 2021, entitled MAGNETIC FIELD CANCELING AUDIO DEVICES; U.S. patent application Ser. No. 17/501,670, filed Oct. 14, 2021, entitled ELECTRONIC MARKER-BASED NAVIGATION SYSTEMS AND METHODS FOR USE IN GNSS-DEPRIVED ENVIRONMENTS; U.S. Pat. No. 11,156,737, issued Oct. 26, 2021, entitled BURIED OBJECT LOCATOR APPARATUS AND METHODS; U.S. Pat. No. 11,171,369, issued Nov. 9, 2021, entitled MODULAR BATTERY PACK APPARATUS, SYSTEMS, AND METHODS; U.S. patent application Ser. No. 17/522,857, filed Nov. 9, 2021, entitled WIRELESS BURIED PIPE AND CABLE LOCATING SYSTEMS; U.S. patent application Ser. No. 17/523,857, filed Nov. 10, 2021, entitled SONDE DEVICES INCLUDING A SECTIONAL FERRITE CORE STRUCTURE; U.S. Pat. No. 11,175,427, issued Nov. 16, 2021, entitled BURIED UTILITY LOCATING SYSTEMS WITH OPTIMIZED WIRELESS DATA COMMUNICATION; U.S. patent application Ser. No. 17/531,533, filed Nov. 19, 2021, entitled INPUT MULTIPLEXED SIGNAL PROCESSING APPARATUS AND METHODS; U.S. patent application Ser. No. 17/540,239, filed Dec. 1, 2021, entitled DUAL SENSED LOCATING SYSTEMS AND METHODS; U.S. patent application Ser. No. 17/541,057, filed Dec. 2, 2021, entitled COLOR-INDEPENDENT MARKER DEVICE APPARATUS, SYSTEMS, AND METHODS; U.S. patent application Ser. No. 17/540,231, filed Dec. 2, 2021, entitled AUTO-TUNING CIRCUIT APPARATUS AND METHODS; U.S. Pat. No. 11,193,767, issued Dec. 7, 2021, entitled SMART PAINT STICK DEVICES AND METHODS; U.S. Pat. No. 11,199,521, issued Dec. 14, 2021, entitled RESILIENTLY DEFORMABLE MAGNETIC FIELD CORE APPARATUS AND APPLICATIONS; U.S. Pat. No. 11,204,246, issued Dec. 21, 2021, entitled DUAL SENSED LOCATING SYSTEMS AND METHODS; U.S. Provisional Patent Application 63/293,828, filed Dec. 26, 2021, entitled MODULAR BATTERY SYSTEMS INCLUDING BATTERY INTERFACE APPARATUS; U.S. patent application Ser. No. 17/563,049, filed Dec. 28, 2021, entitled SONDE DEVICES WITH A SECTIONAL FERRITE CORE; U.S. Provisional Patent Application 63/306,088, filed Feb. 2, 2022, entitled UTILITY LOCATING SYSTEMS AND METHODS WITH FILTER TUNING FOR POWER GRID FLUCTUATIONS; U.S. patent application Ser. No. 17/687,538, filed Mar. 4, 2022, entitled ANTENNAS, MULTI-ANTENNA APPARATUS, AND ANTENNA HOUSINGS; U.S. patent application Ser. No. 17/694,640, filed Mar. 14, 2022, entitled UTILITY LOCATORS WITH RETRACTABLE SUPPORT STRUCTURES AND APPLICATIONS THEREOF; U.S. patent application Ser. No. 17/694,656, filed Mar. 14, 2022, entitled ELECTROMAGNETIC MARKER DEVICES FOR BURIED OR HIDDEN USE; U.S. Pat. No. 11,280,934, issued Mar. 22, 2022, entitled ELECTROMAGNETIC MARKER DEVICES FOR BURIED OR HIDDEN USE; U.S. Pat. No. 11,300,597, issued Apr. 12, 2022, entitled SYSTEMS AND METHODS FOR LOCATING AND/OR MAPPING BURIED UTILITIES USING VEHICLE-MOUNTED LOCATING DEVICES; U.S. Pat. No. 11,300,700, issued Apr. 12, 2022, entitled SYSTEMS AND METHODS OF USING A SONDE DEVICE WITH A SECTIONAL FERRITE CORE STRUCTURE; U.S. Pat. No. 11,300,701, issued Apr. 12, 2022, entitled UTILITY LOCATORS WITH RETRACTABLE SUPPORT STRUCTURES; U.S. patent application Ser. No. 17/728,949, filed Apr. 25, 2022, entitled BURIED UTILITY LOCATOR GROUND TRACKING APPARATUS, SYSTEMS, AND METHODS; U.S. patent application Ser. No. 17/731,579, filed Apr. 28, 2022, entitled BURIED UTILITY MARKER DEVICES, SYSTEMS, AND METHODS; and U.S. Pat. No. 11,333,786, issued May 17, 2022, entitled BURIED UTILITY MARKER DEVICES, SYSTEMS, AND METHODS; U.S. patent application Ser. No. 17/845,290, filed Jun. 21, 2022, entitled DAYLIGHT VISIBLE AND MULTI-SPECTRAL LASER RANGEFINDER AND ASSOCIATED METHODS AND UTILITY LOCATOR DEVICES; and U.S. Pat. No. 11,366,245, issued Jun. 21, 2022, entitled BURIED UTILITY LOCATOR GROUND TRACKING APPARATUS, SYSTEMS, AND METHODS; U.S. Provisional Patent Application 63/368, 879, filed Jul. 19, 2022, entitled NATURAL VOICE UTILITY ASSET ANNOTATION SYSTEM; U.S. Pat. No. 11,397,274, issued Jul. 26, 2022, entitled TRACKED DISTANCE MEASURING DEVICES, SYSTEMS, AND METHODS; U.S. patent application Ser. No. 17/815,387, filed Jul. 27, 2022, entitled INWARD SLOPED DRUM FACE FOR PIPE INSPECTION CAMERA SYSTEM; U.S. Pat. No. 11,404,837, issued Aug. 2, 2022, entitled ROBUST IMPEDANCE CONTROLLED SLIP RINGS; U.S. Pat. No. 11,402,237, issued Aug. 2, 2022, entitled VIDEO PIPE INSPECTION SYSTEMS WITH VIDEO INTEGRATED WITH ADDITIONAL SENSOR DATA; U.S. Provisional Patent Application 63/370,760, filed Aug. 8, 2022, entitled SYSTEMS AND METHODS FOR INSPECTION ANIMATION; U.S. Pat. No. 11,418,761, issued Aug. 16, 2022, entitled INSPECTION CAMERA DEVICES AND METHODS WITH SELECTIVELY ILLUMINATED MULTISENSOR IMAGING SYSTEMS; U.S. Pat. No. 11,428,814, issued Aug. 30, 2022, entitled OPTICAL GROUND TRACKING APPARATUS, SYSTEMS, AND METHODS FOR USE WITH BURIED UTILITY LOCATORS; U.S. patent application Ser. No. 17/930,029, filed Sep. 6, 2022, entitled GNSS POSITIONING METHODS AND DEVICES USING PPP-RTK, RTK, SSR, OR LIKE CORRECTION DATA; U.S. Pat. No. 11,448,600, issued Sep. 20, 2022, entitled MULTI-CAMERA PIPE INSPECTION APPARATUS, SYSTEMS, AND METHODS; U.S. patent application Ser. No. 17/935,564, filed Sep. 26, 2022, entitled SYSTEMS AND METHODS FOR DETERMINING AND DISTINGUISHING BURIED OBJECT USING ARTIFICIAL INTELLIGENCE; U.S. Pat. No. 11,460,598, issued Oct. 4, 2022, entitled USER INTERFACES FOR UTILITY LOCATORS; U.S. Pat. No. 11,467,317, issued Oct. 11, 2022, entitled ELECTROMAGNETIC MARKER DEVICES WITH SEPARATE RECEIVE AND TRANSMIT ANTENNA ELEMENTS; U.S. Pat. No. 11,468,610, issued Oct. 11, 2022, entitled METHODS AND SYSTEMS FOR GENERATING INTERACTIVE MAPPING DISPLAYS IN CONJUNCTION WITH USER INTERFACE DEVICES; U.S. Pat. No. 11,476,539, issued Oct. 18, 2022, entitled MODULAR BATTERY PACK APPARATUS, SYSTEMS, AND METHODS INCLUDING VIRAL DATA AND/OR CODE TRANSFER; U.S. Pat. No. 11,474,276, issued Oct. 18, 2022, entitled SYSTEMS AND METHODS FOR UTILITY LOCATING IN A MULTI-UTILITY ENVIRONMENT; U.S. Pat. No. 11,476,851, issued Oct. 18, 2022, entitled MAGNETICALLY SENSED USER INTERFACE DEVICES; U.S. Provisional Patent Application 63/380,375, filed Oct. 20, 2022, entitled LINKED CABLE-HANDLING AND CABLE-STORAGE DRUM DEVICES AND SYSTEMS FOR THE COORDINATED MOVEMENT OF A PUSH-CABLE; U.S. Provisional Patent Application 63/435,148, filed Dec. 23, 2022, entitled SYSTEMS, APPARATUS, AND METHODS FOR DOCUMENTING UTILITY POTHOLES AND ASSOCIATED UTILITY LINES; U.S. patent application Ser. No. 18/089,266, filed Dec. 27, 2022, entitled MODULAR BATTERY SYSTEMS INCLUDING INTERCHANGEABLE BATTERY INTERFACE APPARATUS; U.S. patent application Ser. No. 18/162,663, filed Jan. 31, 2023, entitled UTILITY LOCATING SYSTEMS AND METHODS WITH FILTER TUNING FOR POWER GRID FLUCTUATIONS; U.S. Provisional Patent Application 63/485,905, filed Feb. 18, 2023, entitled SYSTEMS AND METHODS FOR INSPECTION ANIMATION; U.S. Provisional Patent Application 63/492,473, filed Mar. 27, 2023, entitled VIDEO INSPECTION AND CAMERA HEAD TRACKING SYSTEMS AND METHODS; U.S. Pat. No. 11,614,613, issued Mar. 28, 2023, entitled DOCKABLE CAMERA REEL AND CCU SYSTEM; U.S. Pat. No. 11,649,917, issued May 16, 2023, entitled INTEGRATED FLEX-SHAFT CAMERA SYSTEM WITH HAND CONTROL; U.S. Pat. No. 11,665,321, issued May 30, 2023, entitled PIPE INSPECTION SYSTEM WITH REPLACEABLE CABLE STORAGE DRUM; and U.S. Pat. No. 11,674,906, issued Jun. 13, 2023, entitled SELF-LEVELING INSPECTION SYSTEMS AND METHODS; U.S. Provisional Patent Application 63/510,014, filed Jun. 23, 2023, entitled INNER DRUM MODULE WITH PUSH-CABLE INTERFACE FOR PIPE INSPECTION; U.S. Pat. No. 11,709,289, issued Jul. 25, 2023, entitled SONDE DEVICES WITH A SECTIONAL FERRITE CORE; U.S. patent application Ser. No. 18/365,225, filed Aug. 3, 2023, entitled SYSTEMS AND METHODS FOR INSPECTION ANIMATION; U.S. Pat. No. 11,719,376, issued Aug. 8, 2023, entitled DOCKABLE TRIPODAL CAMERA CONTROL UNIT; U.S. patent application Ser. No. 18/490,763, filed Oct. 20, 2023, entitled LINKED CABLE-HANDLING AND CABLE-STORAGE DRUM DEVICES AND SYSTEMS FOR THE COORDINATED MOVEMENT OF A PUSH-CABLE; U.S. Provisional Patent Application 63/599,890, filed Nov. 16, 2023, entitled VIDEO INSPECTION AND CAMERA HEAD TRACKING SYSTEMS AND METHODS; U.S. patent application Ser. No. 18/528,773, filed Dec. 4, 2023, entitled PIPE INSPECTION SYSTEM CAMERA HEAD; U.S. Pat. No. 11,842,474, issued Dec. 12, 2023, entitled PIPE INSPECTION SYSTEM CAMERA HEADS; U.S. patent application Ser. No. 18/539,265, filed Dec. 14, 2023, entitled INTEGRAL DUAL CLEANER DRUM SYSTEMS AND METHODS; U.S. patent application Ser. No. 18/539,268, filed Dec. 14, 2023, entitled HIGH FREQUENCY AC-POWERED DRAIN CLEANING AND INSPECTION APPARATUS AND METHODS; U.S. Pat. No. 11,846,095, issued Dec. 19, 2023, entitled HIGH FREQUENCY AC-POWERED DRAIN CLEANING AND INSPECTION APPARATUS & METHODS; U.S. Pat. No. 11,859,755, issued Jan. 2, 2024, entitled INTEGRAL DUAL CLEANER CAMERA DRUM SYSTEMS AND METHODS; U.S. patent application Ser. No. 18/412,452, filed Jan. 12, 2024, entitled MULTI-CAMERA APPARATUS FOR WIDE ANGLE PIPE INTERNAL INSPECTION; U.S. patent application Ser. No. 18/414,785, filed Jan. 17, 2024, entitled SONDE DEVICES; U.S. Pat. No. 11,879,852, issued Jan. 23, 2024, entitled MULTI-CAMERA APPARATUS FOR WIDE ANGLE PIPE INTERNAL INSPECTION; U.S. Pat. No. 11,880,005, issued Jan. 23, 2024, entitled SONDE DEVICES INCLUDING A SECTIONAL FERRITE CORE STRUCTURE; U.S. Provisional Patent Application 63/625,259, filed Jan. 25, 2024, entitled ACCESSIBLE DRUM-REEL FRAME FOR PIPE INSPECTION CAMERA SYSTEM; U.S. Provisional Patent Application 63/552,522, filed Feb. 12, 2024, entitled ACCESSIBLE DRUM-REEL FRAME FOR PIPE INSPECTION CAMERA SYSTEM; U.S. Pat. No. 11,909,150, issued Feb. 20, 2024, entitled ROBUST IMPEDANCE CONTROLLED SLIP RINGS; U.S. patent application Ser. No. 18/611,449, issued Mar. 20, 2024, entitled VIDEO INSPECTION AND CAMERA HEAD TRACKING SYSTEMS AND METHODS; U.S. Pat. No. 11,962,943, issued Apr. 16, 2024, entitled INSPECTION CAMERA DEVICES AND METHODS; and U.S. Pat. No. 11,988,951, issued May 21, 2024, entitled MULTI-DIELECTRIC COAXIAL PUSH-CABLES AND ASSOCIATED APPARATUS. The content of each of the above-described patents and applications is incorporated by reference herein in its entirety. The above applications may be collectively denoted herein as the "co-assigned applications" or "incorporated applications."

DETAILED DESCRIPTION OF EMBODIMENTS

It is noted that as used herein, the term "exemplary" means "serving as an example, instance, or illustration." Any aspect, detail, function, implementation, and/or embodiment described herein as "exemplary" is not necessarily to be construed as preferred or advantageous over other aspects and/or embodiments.

Example Embodiments

Figure 1A:
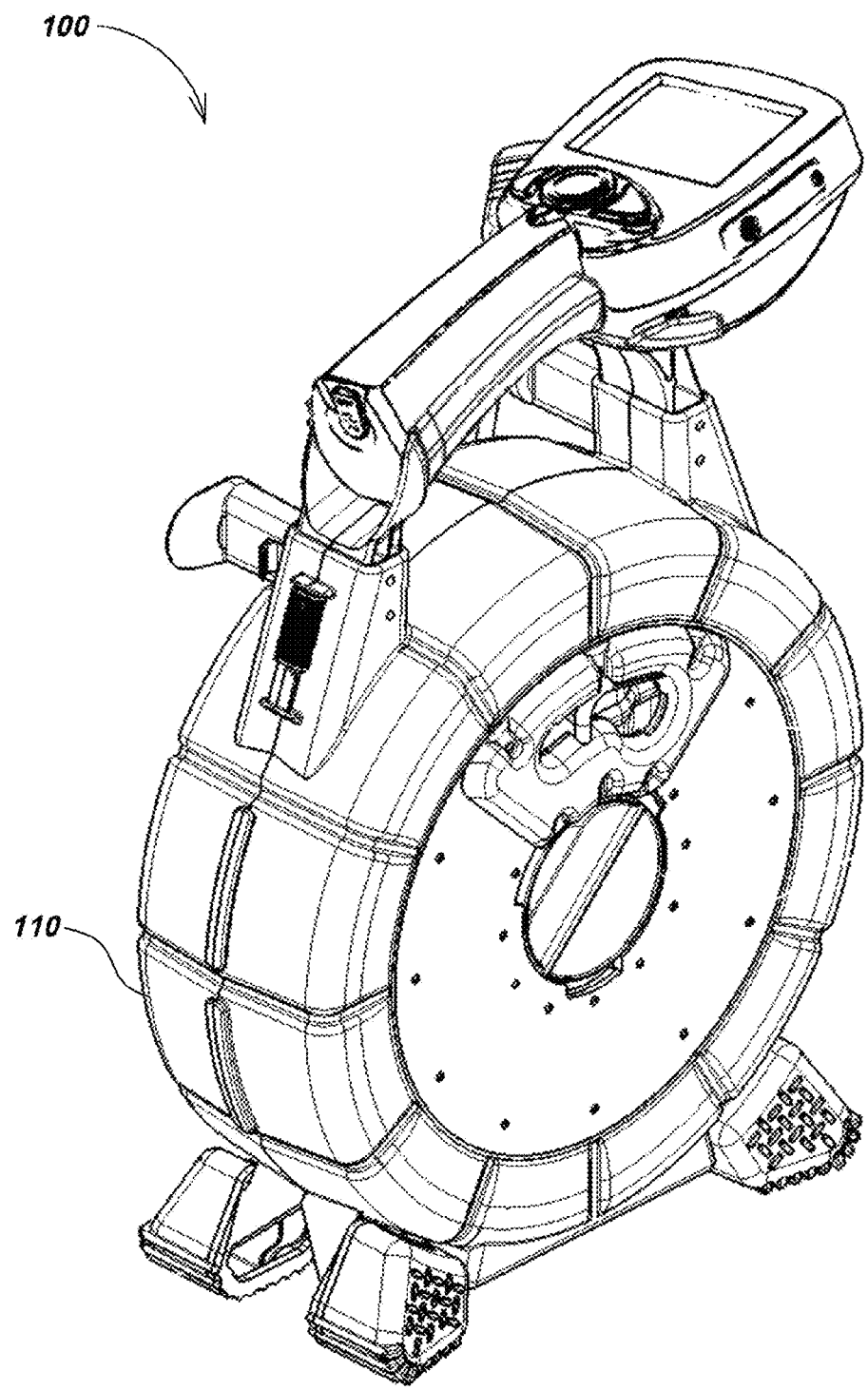
FIG. 1A is an illustration of an embodiment of a cable storage drum for a pipe inspection system, as known in the prior art.

FIG. 1A illustrates details of an exemplary prior art embodiment of a cable storage drum 100 for a pipe inspection system. Cable storage drum 100 includes an outer enclosure 110 to provide a housing, as well as environmental protection for a stored push-cable (not shown).

Figure 1B:
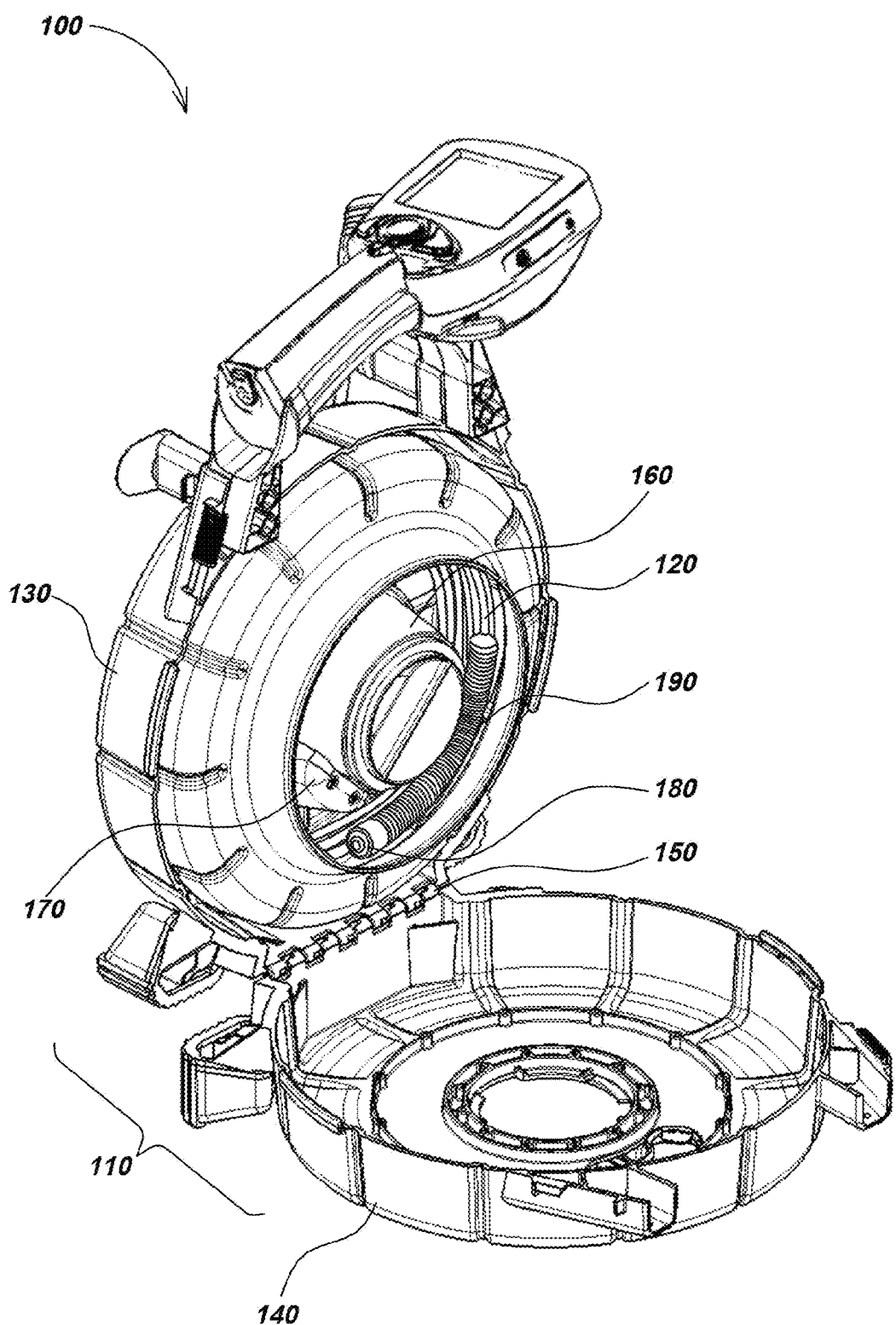
FIG. 1B is an illustration of an embodiment showing an inside view of a cable storage drum for a pipe inspection system, as known in the prior art.

FIG. 1B illustrates details of an exemplary prior art embodiment showing an inside view of a cable storage drum 100 for a pipe inspection system. A push-cable 120 is contained within enclosure 110. Enclosure 110 may include a first half housing 130 and a second half housing 140. The housing halves may be hinged 150 to allow access to the inside of enclosure 110. Push-cable 120 is typically attached to a rotating hub 160 via a cable attachment mechanism 170. A camera head 180 may be attached at the distal end of push-cable 120 through a flexible guiding coil 190. Hub 170 may include interfaces for one or more electrical components. Electrical connectivity is typically maintained with the rotating hub 150 through a slip-ring (not shown). One or more cable guides (not shown) may be provided to direct push-cable 120 into and out of enclosure 110.

Figure 2A:
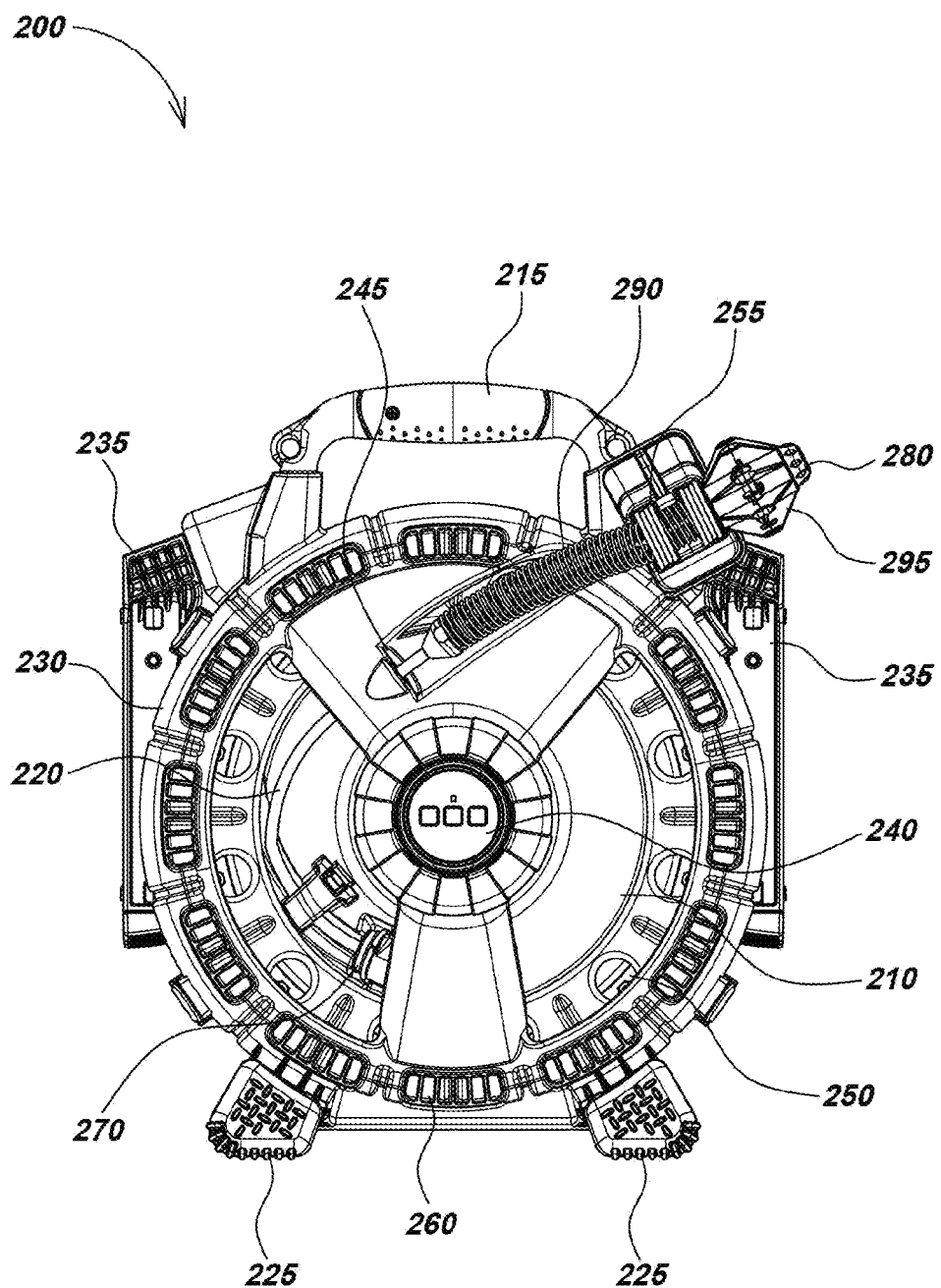
FIG. 2A is an illustration of an embodiment of a cable storage drum with an inner drum module with a push-cable interface, in accordance with certain aspects of the present invention.

FIG. 2A illustrates details of an exemplary cable storage drum 200 with an inner drum module 210 with a push-cable 220 interface. Cable storage drum 200 includes a housing or enclosure 230 to protect inner drum module 210 and other internal components. Inner drum module 210 is capable of rotating bidirectionally around a stationary axis 240. Various sized and shaped viewing holes, slots, or windows 250 may be provided on inner drum module 210 to provide viewing of push-cable 220. Additional venting holes or slots 260 may be provided on enclosure 230 to provide venting, and to reduce the overall weight of cable storage drum 200.

Push-cable 220 may be connected to inner drum module 210 via a cable attachment mechanism 270. A camera head 280 may be attached at the distal end of push-cable 220 through a flexible guiding coil 290. One or more pipe guides 295 may be attached to camera head 280 to help guide and protect camera head 280 as it is being inserted into and out of a utility pipe or or conduit for inspection.

Cable storage drum 200 may include various accessories or components such as none or more handles 215, non-slip feet 225, and/or foldable legs 235 for allowing cable storage drum 200 to be set in multiple non-upright positions. One or more cable guides 245 and 255 may be provided to facilitate the movement of push-cable 220 into and out of cable storage drum 200.

Figure 2B:
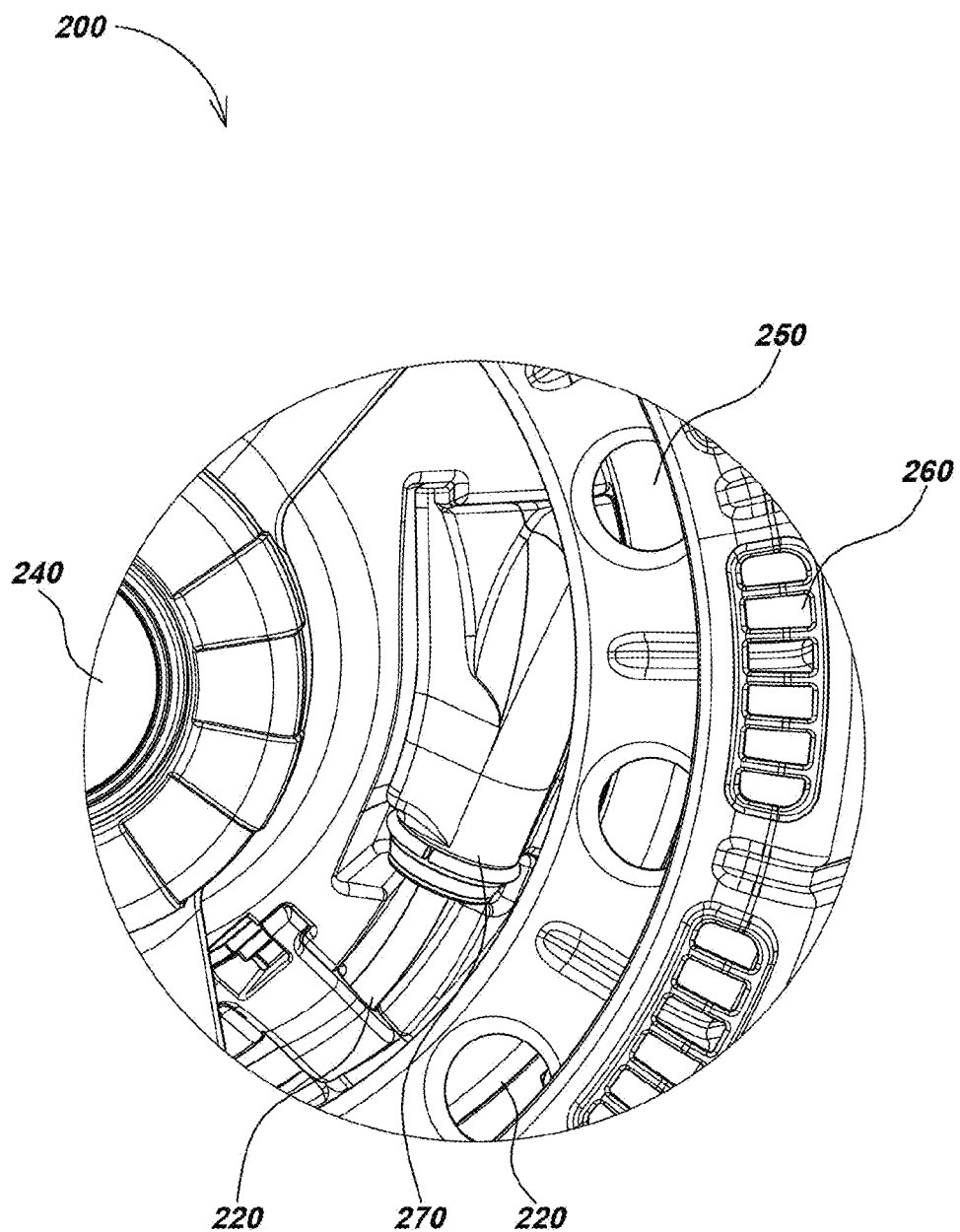
FIG. 2B is an enlarged partial view of an illustration of an embodiment of a cable storage drum with an inner drum module with a push-cable interface, in accordance with certain aspects of the present invention.

FIG. 2B illustrates details of an enlarged partial view 200 of an illustration of an embodiment of a cable storage drum 200 with an inner drum module 210 with a push-cable 220 interface, in accordance with certain aspects of the present invention. Viewing holes, slots, or windows 250 allow viewing of push-cable 220 inside the cable storage drum 200. This may be useful to determine how much of the push-cable 220 is being stored in cable storage drum 200 vs how much cable is being deployed into a utility pipe or conduit, as well as providing feedback as to the general condition of the push-cable 220 (e.g. good condition vs bad condition, i.e. dirty, greasy, frayed, etc.).

Figure 2C:
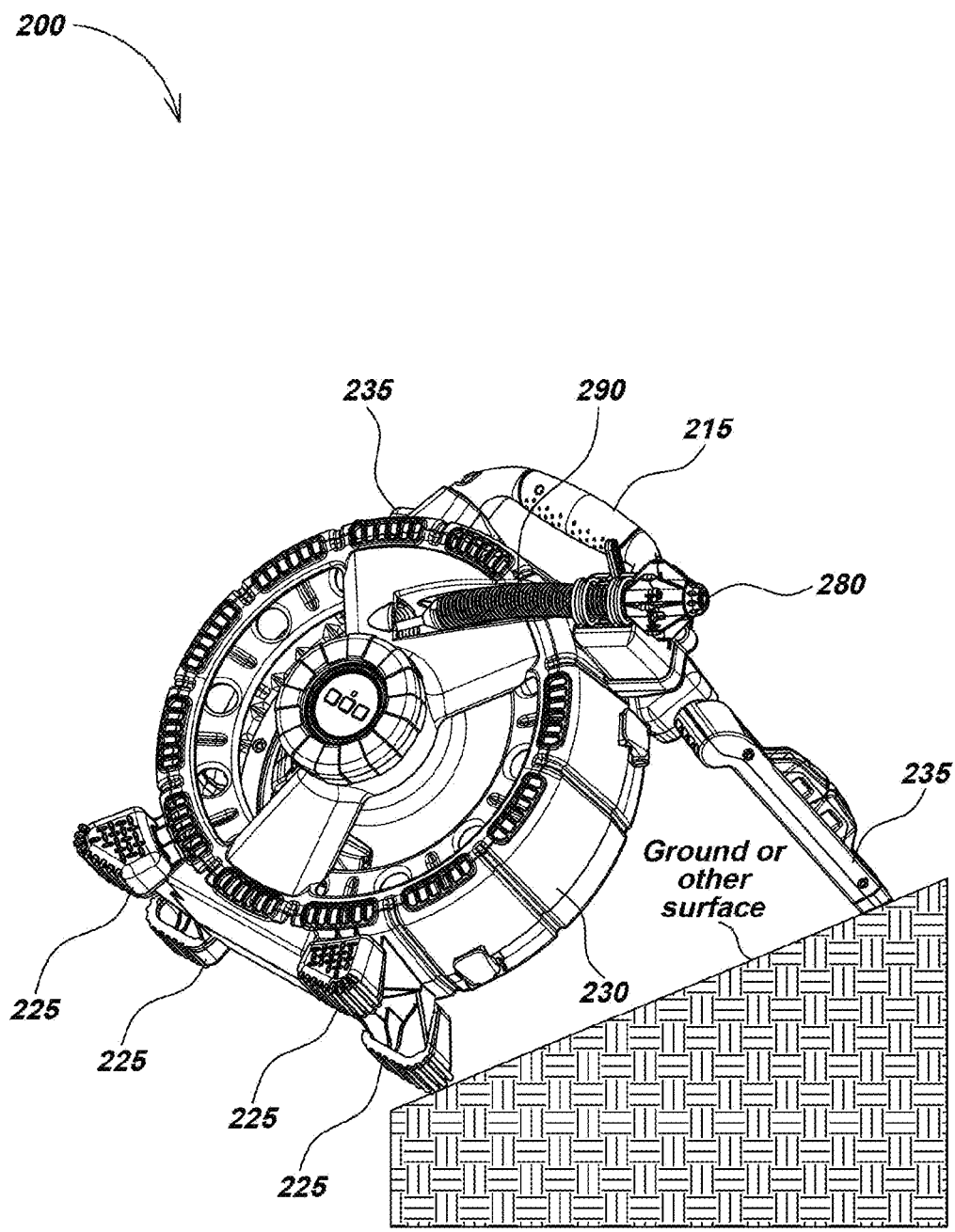
FIG. 2C is an illustration of an alternate view of an embodiment of a cable storage drum with an inner drum module with a push-cable interface, in accordance with certain aspects of the present invention.

FIG. 2C illustrates details of an alternate view 200 of an illustration of an embodiment of a cable storage drum 200 with an inner drum module 210 with a push-cable 220 interface, in accordance with certain aspects of the present invention. Non-slip feet 225 and foldable legs 235 allow the cable storage drum 200 to be leaned back towards the ground or other surface 265 at multiple angles which may better facilitate use of cable storage drum 200 and push-cable 220 during the inspection of a utility pipe or conduit.

Figure 3:
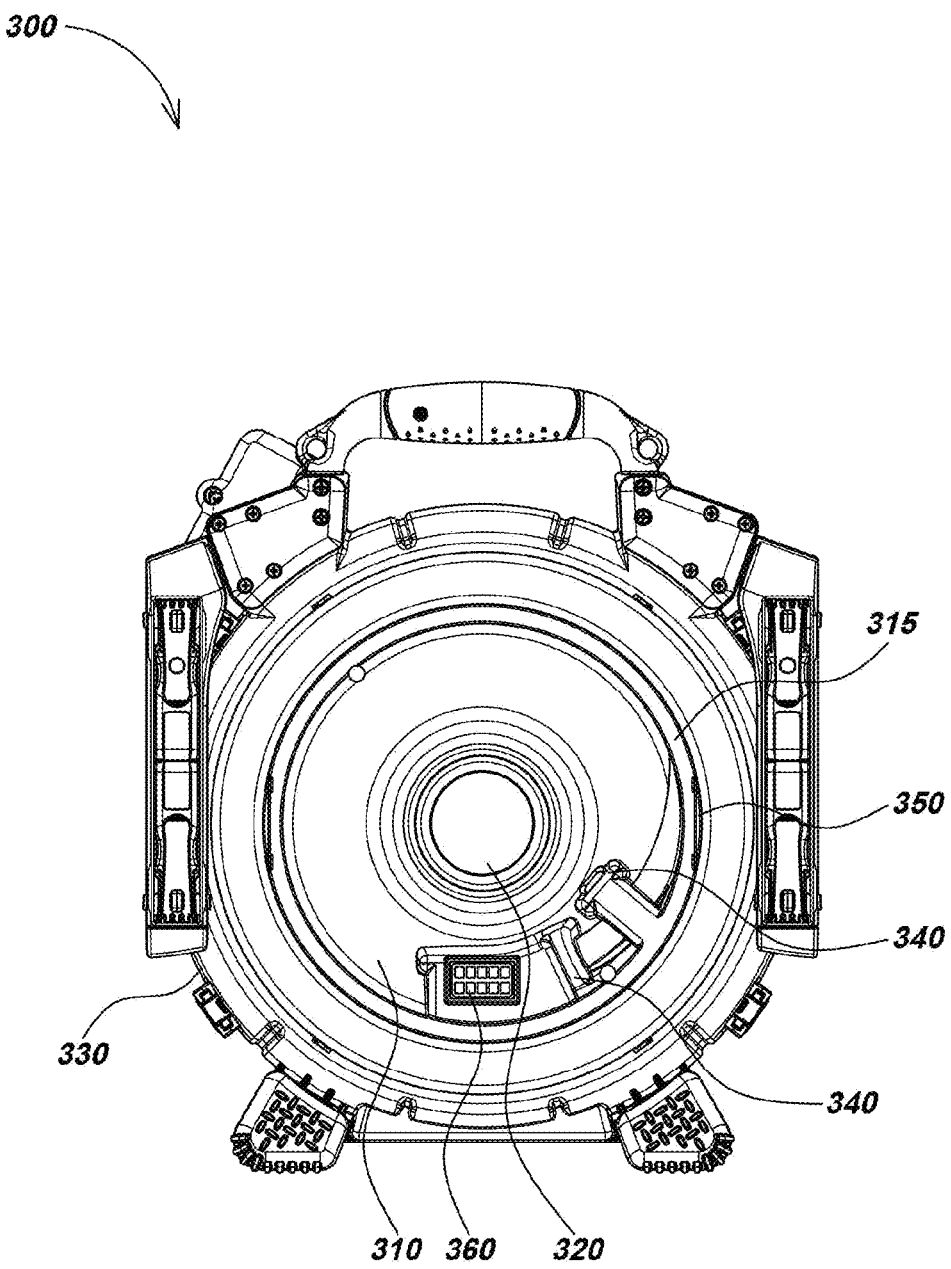
FIG. 3 is an illustration of an embodiment of a cable storage drum 300 configured for an inner core module, in accordance with certain aspects of the present invention.

FIG. 3 illustrates details of an illustration of an embodiment of a cable storage drum 300 configured for an inner core drum module. A hollow core outer cone 310 is configured to rotate bidirectionally around a stationary axis or hub 320. An enclosure 330 provides a housing, as well as environmental protection for a stored push-cable (not shown). Enclosure 330 at least partially covers both the outer cone 310 and the stationary axis 320. Outer cone 310 is configured to rotate bidirectionally (i.e. clockwise or counter clockwise) around a stationary axis of cable storage drum 300.

Outer cone 310 is also configured to accept and mate with an inner core module (not shown) which contains various interfaces for one or more electrical and/or mechanical components, including a power source. Various shaped and sized tabs or edges 340 and grooves or indentations 350 may be provided to line up and mate with tabs and grooves on the inner core drum module (not shown). An electrical connector 360 is provided to mate with an electrical connector on inner core module 400 to provide connectivity to any electrical components connected inside inner core module 400. Once mated, outer cone 310 and the inner core module 400 are locked together relative to each other, thereby allowing both outer cone 310 and the inner core drum to move together simultaneously.

Figure 4A:
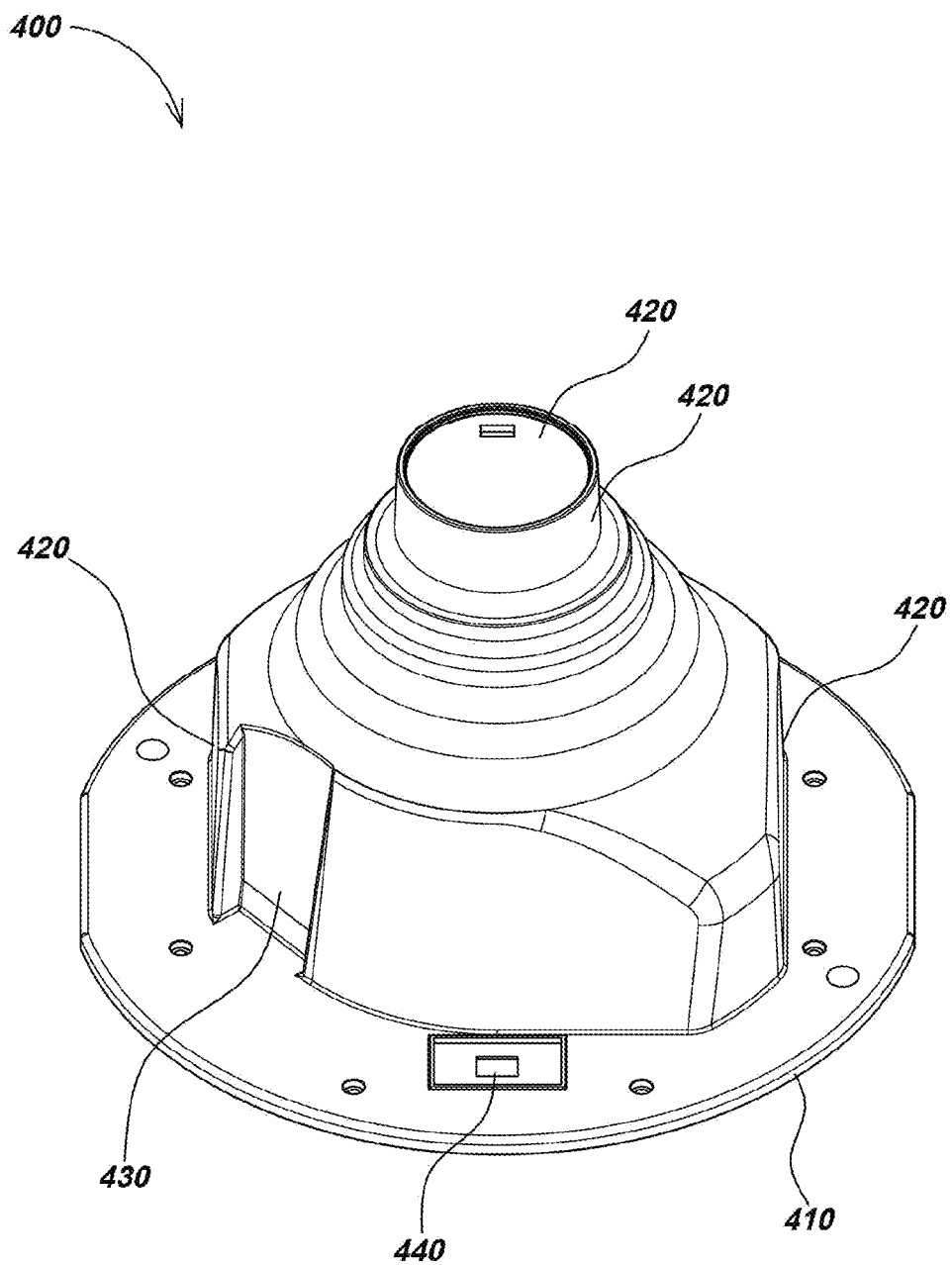
FIGS. 4A-C are illustrations of an embodiment of an inner core module, in accordance with certain aspects of the present invention.
Figure 4B:
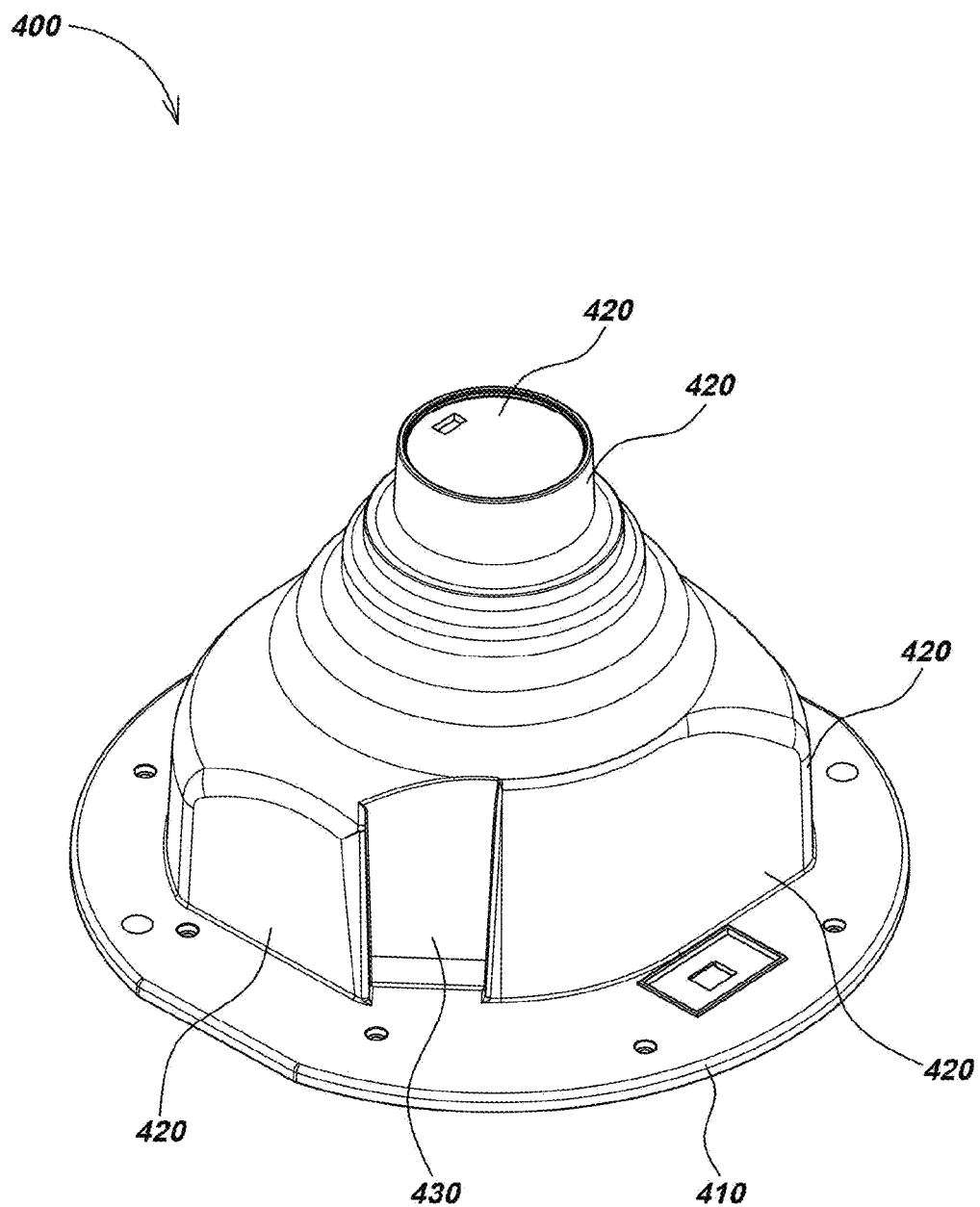
Figure 4C:
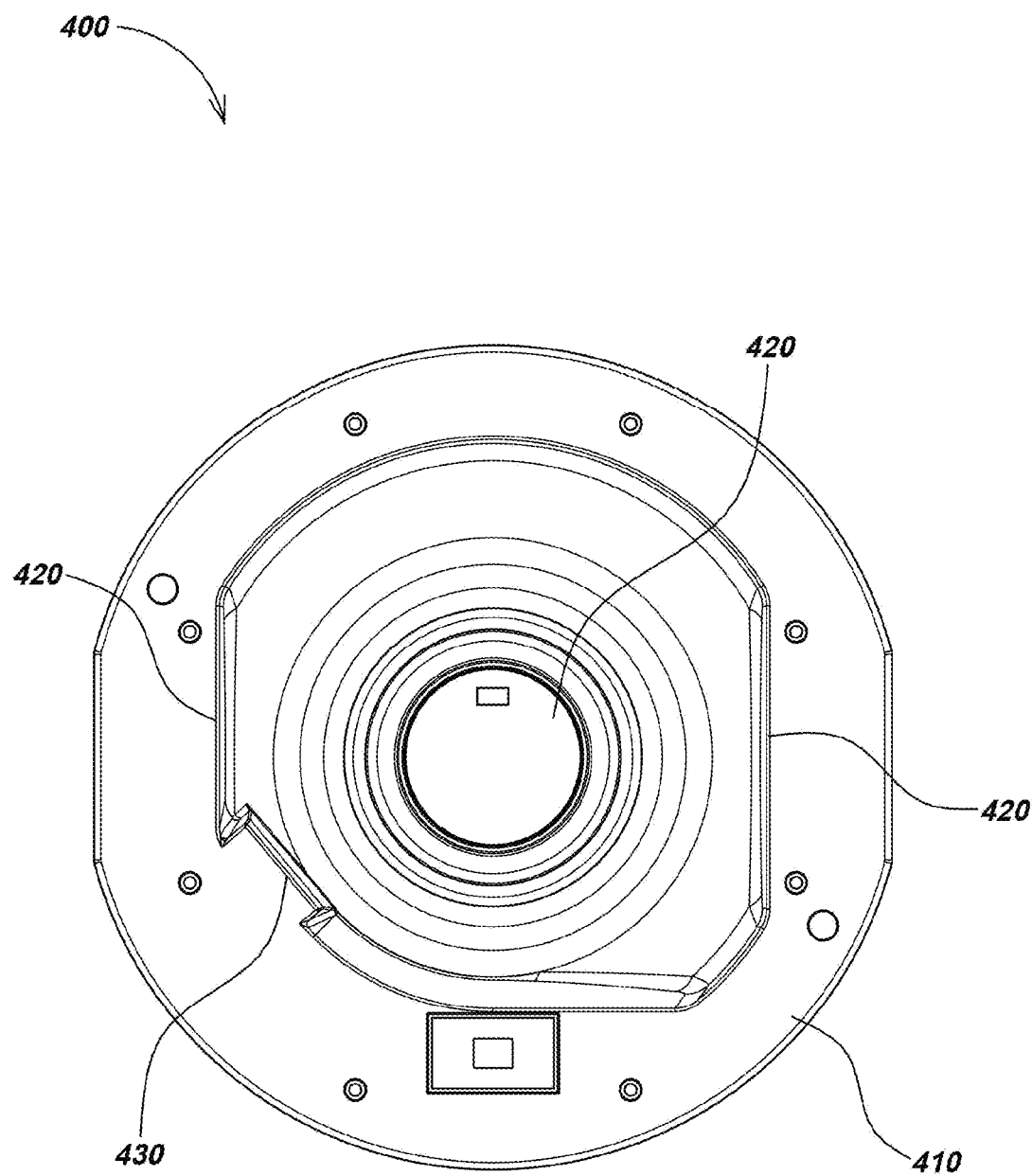

FIGS. 4A-4C illustrate details of an embodiment of an inner core module 400 for a cable storage drum. A baseplate 410 is provided to line up relatively flush with the outer cone edge 315 of outer cone 310 when the two parts are mated together. Various shaped and sized tabs or edges 420 and grooves or indentations 430 may be provided to line up and mate with tabs and grooves on the inner core drum module (not shown). An electrical connector 440 is provided to mate with an electrical connector on outer cone 310 to provide connectivity to any electrical components connected inside inner core module 400. A top down view of inner core module 400 is shown in FIG. 4C.

Figure 5:
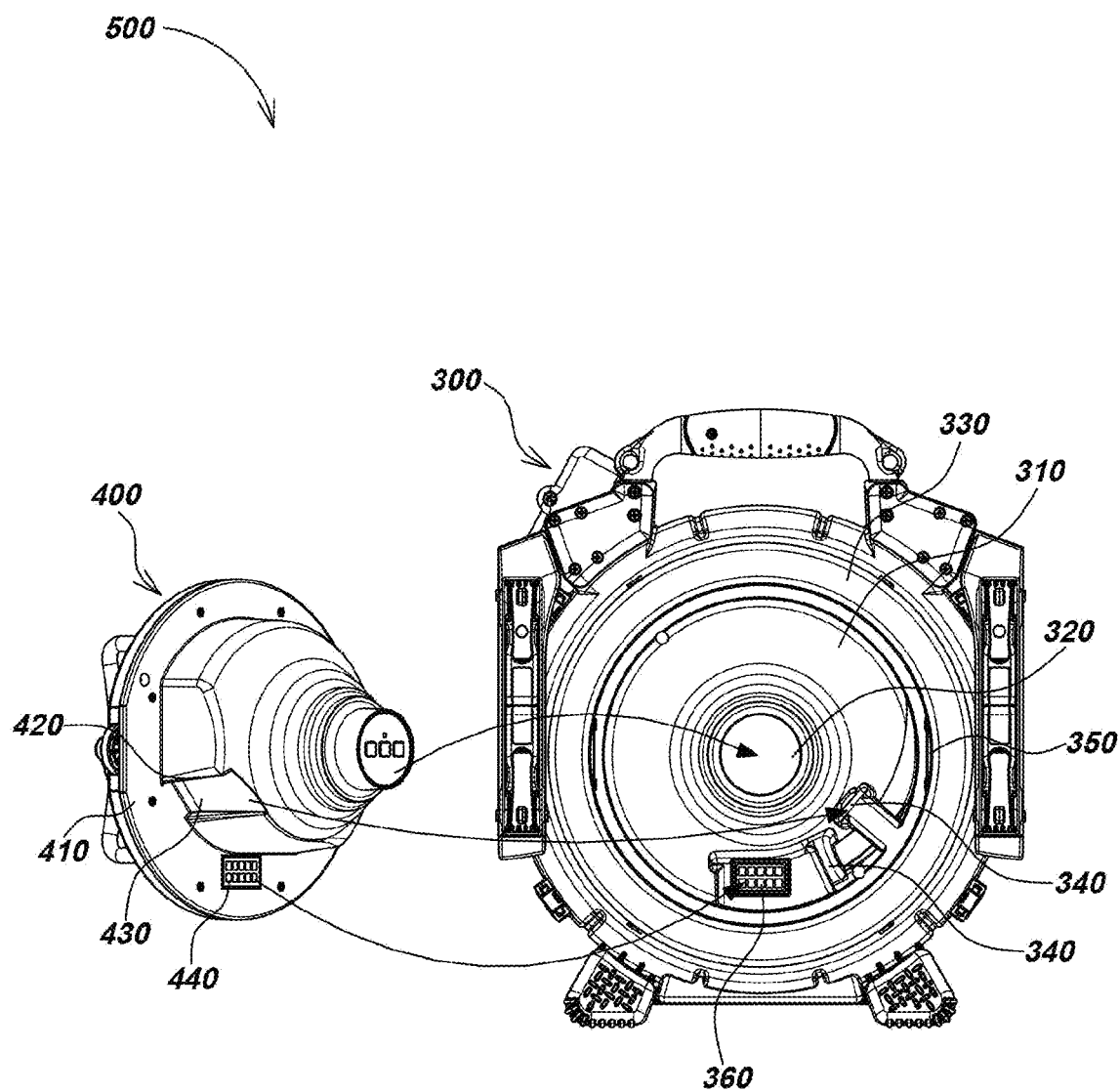
FIG. 5 is an illustration of an an embodiment of an inner core module aligned for insertion into an outer cone of a cable storage drum, in accordance with certain aspects of the present invention.

FIG. 5 illustrates details of an embodiment 500 of an inner core module 400 aligned for insertion into an outer cone 310 of a cable storage drum. The shape of outer cone 310 is such that, when inserted, inner core module 400 will line up, and form a tight fit with outer core 310. Baseplate 410 will come in contact outer cone edge 315 of outer cone 310 when the two parts are mated together. Electrical connectors 360 and 440 will also mate when outer cone 310 and inner core module 400 are aligned and mated. Various tabs and edges 420, as well as grooves and indentations 430, of inner core module 400 may also line up with counter part tabs or edges 340 as well as grooves and indentations 350, of outer cone 310, thereby providing a more secure fit.

Figure 6:
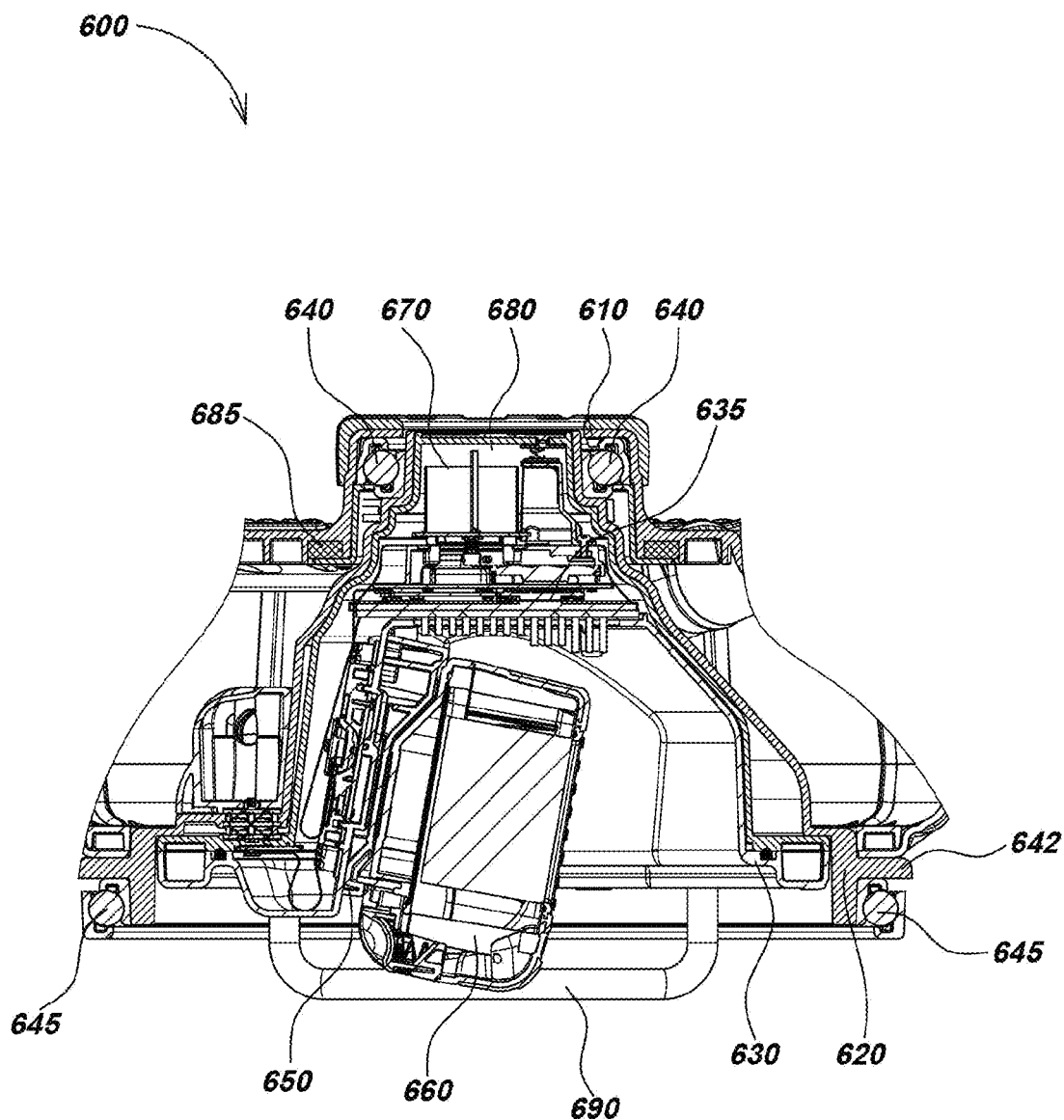
FIG. 6 an illustration of a cut-away view of an embodiment of a cable storage drum with an inner drum module, in accordance with certain aspects of the present invention.

FIG. 6 is an illustration of a cut-away view of an embodiment of a cable storage drum 600 with an inner drum module, in accordance with certain aspects of the present invention. An enclosure (not shown) is provided to cover and protect all drum components. The cable storage drum 600 is attached to a ridged or semi-ridged structure or frame (not shown) via front drum hub 610. An outer cone 620 is configured to accept and mate with inner core module 630 which contains various electronic interfaces 635 (e.g. connectors, tabs, slots, and the like). When outer cone 620 and inner core module 630 are mated, they become fixed together so that when outer cone 620 rotates in one direction, inner core module 630 will rotate in the same direction.

Front bearings 640, and rear bearings 645 allow outer cone 620 and inner core module 630 to rotate bidirectionally (i.e. clockwise or counter clockwise) relative to the cable storage drum frame. Front bearing 640 may also be referred to as small bearing because they are smaller in circumference and/or surface area relative to rear bearings 645 which may also be referred to as large bearings. Front bearings 640 are attached between front drum hub 610 and outer cone 620, and rear bearings 645 are connected between outer cone 620 and rear drum hub 642.

A universal battery plate 650 is configured to accept, and mate with various size modular battery packs 660. Various antennas 670, e.g. WiFi, GPS, GNSS, Bluetooth, etc., as well wireless communication equipment, receivers, transmitter, transceivers, etc., may be provided. In some embodiments, interfaces may be provided to allow different types of wireless communication equipment to be added or removed. One or more magnetic sensors 680 capable of detecting one or more magnets 685 may be provided to count drum rotations relative to the frame. One or more inner core handles 690 may be provided to facility insertion and/or removal of inner core module 630 into and/or out of outer cone 620.

Figure 7A:
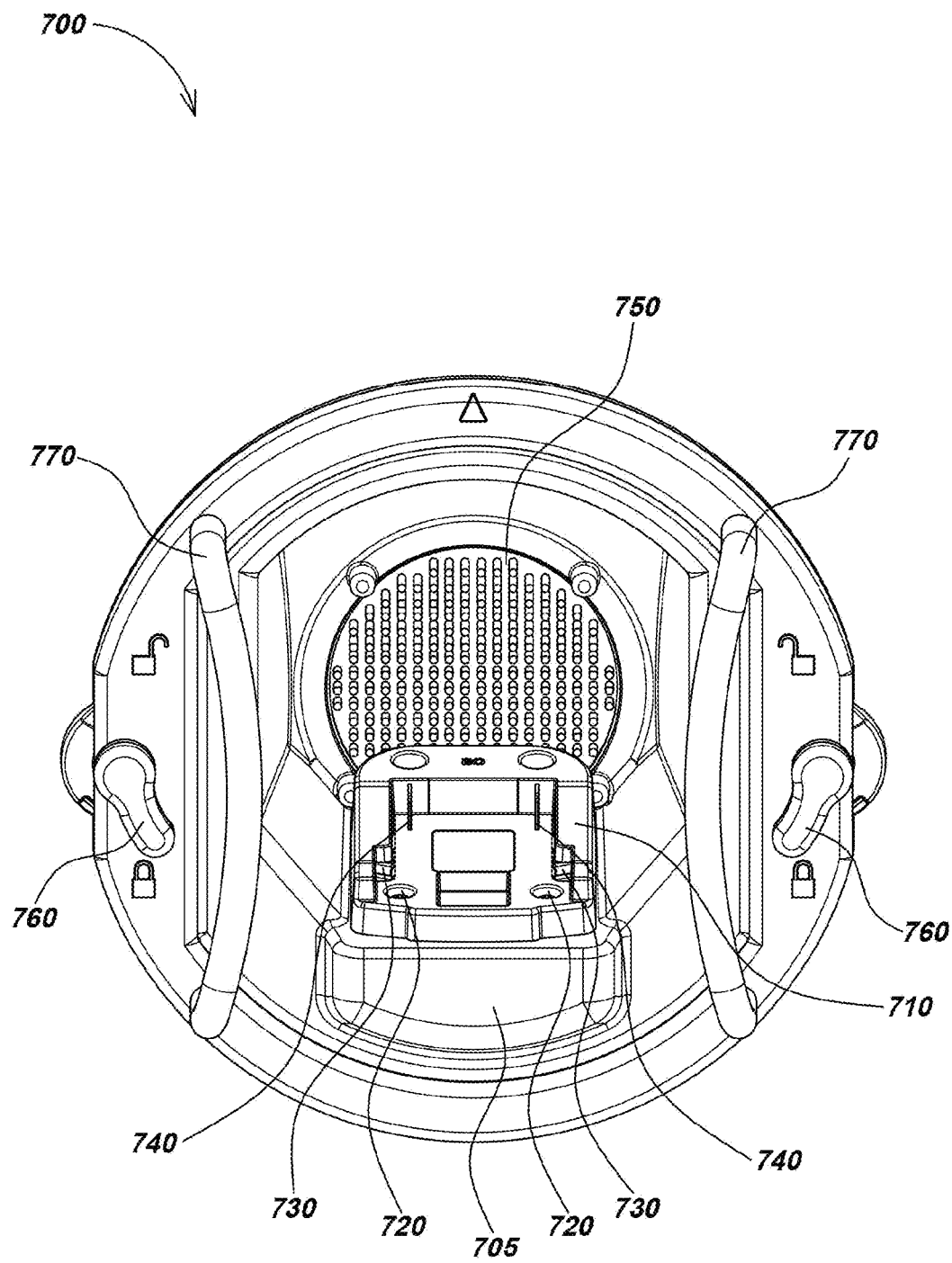
FIG. 7A illustrates details of an inner core module with a battery module interface, in accordance with certain aspects of the present invention.

FIG. 7A illustrates details of an inner core module 700 with a battery module interface 705. The battery module interface 705 includes a replaceable battery tray 710 which is configured to accept various battery modules (not shown) of different types, electrical characteristics, and manufacturers. Battery tray 710 can be easily replaced with a different size or shape of tray to accept additional types and styles of battery modules by removing fasteners 720. Battery tray 710 includes grooves 730 for securing the battery module which may include tabs or rails which interface with the grooves 730. One or more contact tabs 740 are designed to make electrical contact with contacts provided on the battery module. A heatsink 750 is provided to help dissipate heat which may be generated by the battery module or other electrical components which may be located in the inner core module 700. One or more locking mechanisms 760 may be provided to lock inner core module 700 into the outer cone 310 (See FIG. 3). By using a latching or locking mechanism such as locking mechanism 760, it allows a quick way to lock or unlock the inner core module 700 to the outer cone by hand, without requiring a tool. The locking mechanism 760 may lock or slide into and indentation or grove on the outer cone. The locking mechanism 760 could also be located on the outer cone, and an indentation, grove, or other lock mating configuration, could be provide on inner core module 700. It is foreseeable that other types and styles of locking mechanisms 760 may be used. Handles 770 are provided to help insert and remove inner core module 700 into or out of the outer cone.

Figure 7B:
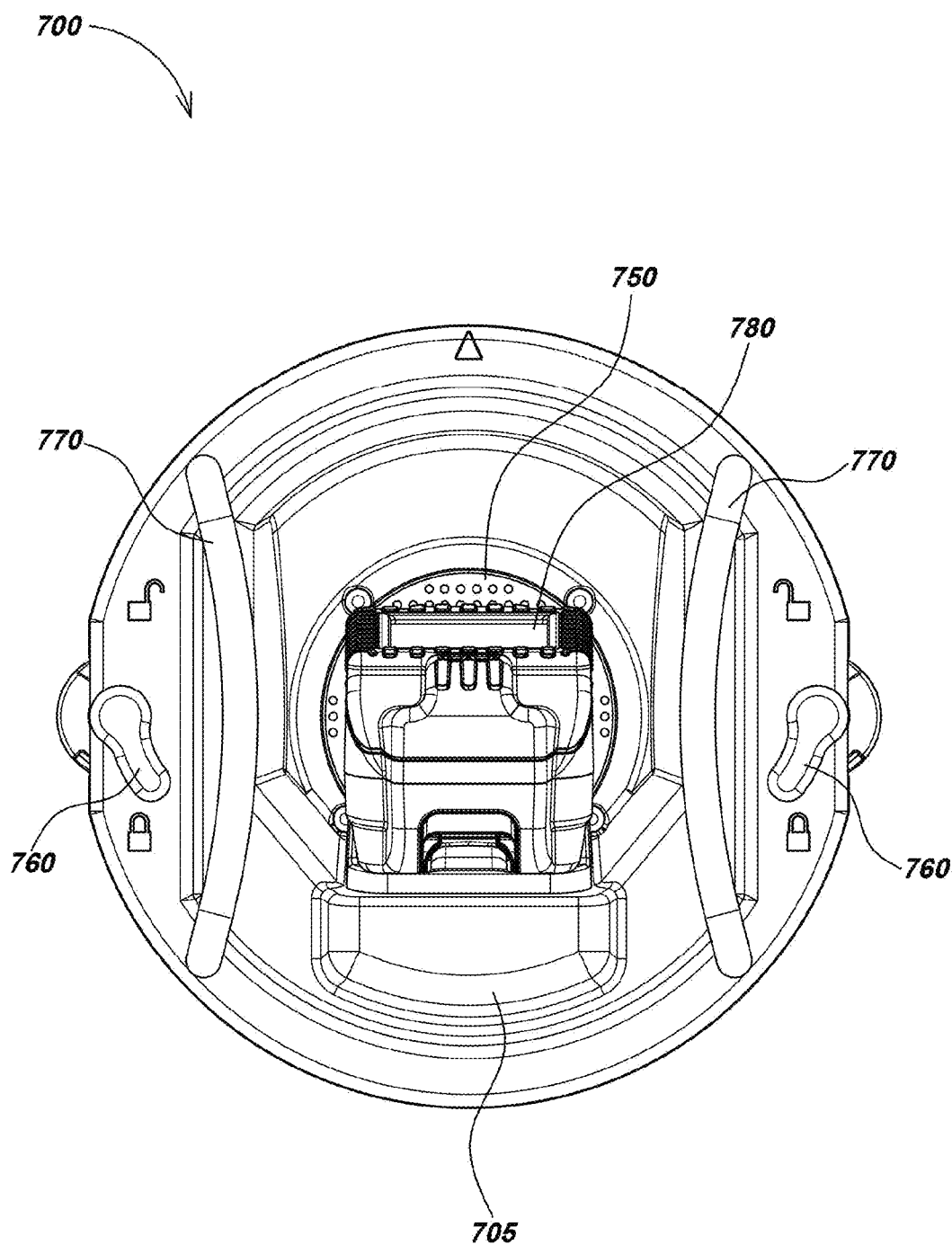
FIG. 7B illustrates details of an inner core module with a battery module interface populated with a battery, in accordance with certain aspects of the present invention.

FIG. 7B illustrates details of an inner core module 700 with a battery module interface 705. Battery 780 is shown installed into battery tray 710.

Figure 8:
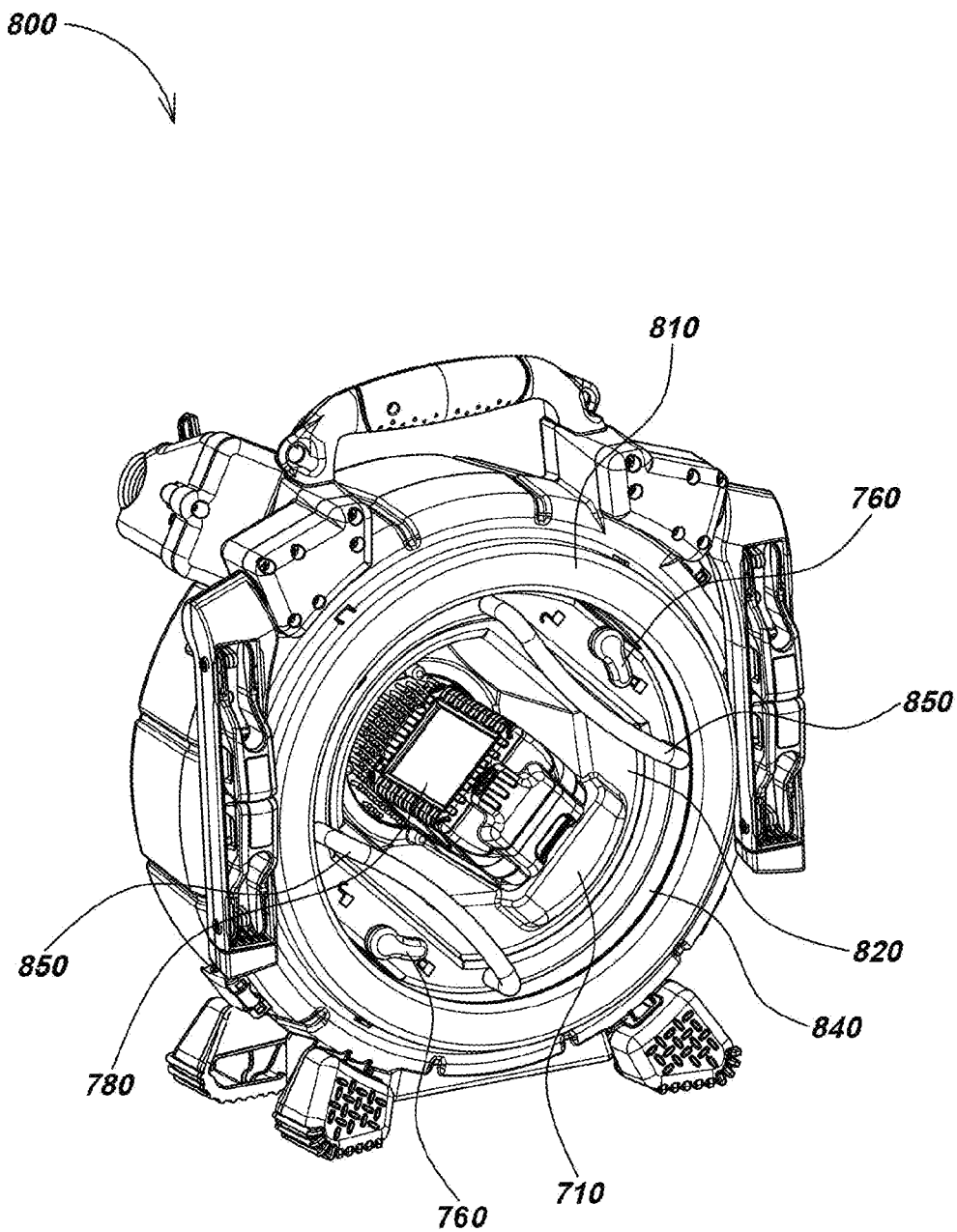
FIG. 8 is an illustration of an embodiment of a rear view (open) of a cable storage drum with an installed battery module, in accordance with certain aspects of the present invention.

FIG. 8 illustrates details an embodiment 800 of a rear view (open) of a cable storage drum 810 with an inner core module 820 installed, in accordance with certain aspects of the present invention. A battery module 780 is shown attached to inner core module 820 via battery module interface 705. One or more locking mechanisms 760 may be provided to secure the inner core module 820 to outer cone 840 which is located inside cable storage drum 810. One or more handles 850 may be provided to facilitate insertion and removal of the inner core module 820 into and out of outer cone 840. A removably attachable clamshell assembly housing including first and second half clamshell enclosures (not shown) may be provided to at least partially cover both the back and front of the cable storage drum 810, thereby providing protection to both cable storage drum components, as well as personnel.

Figure 9:
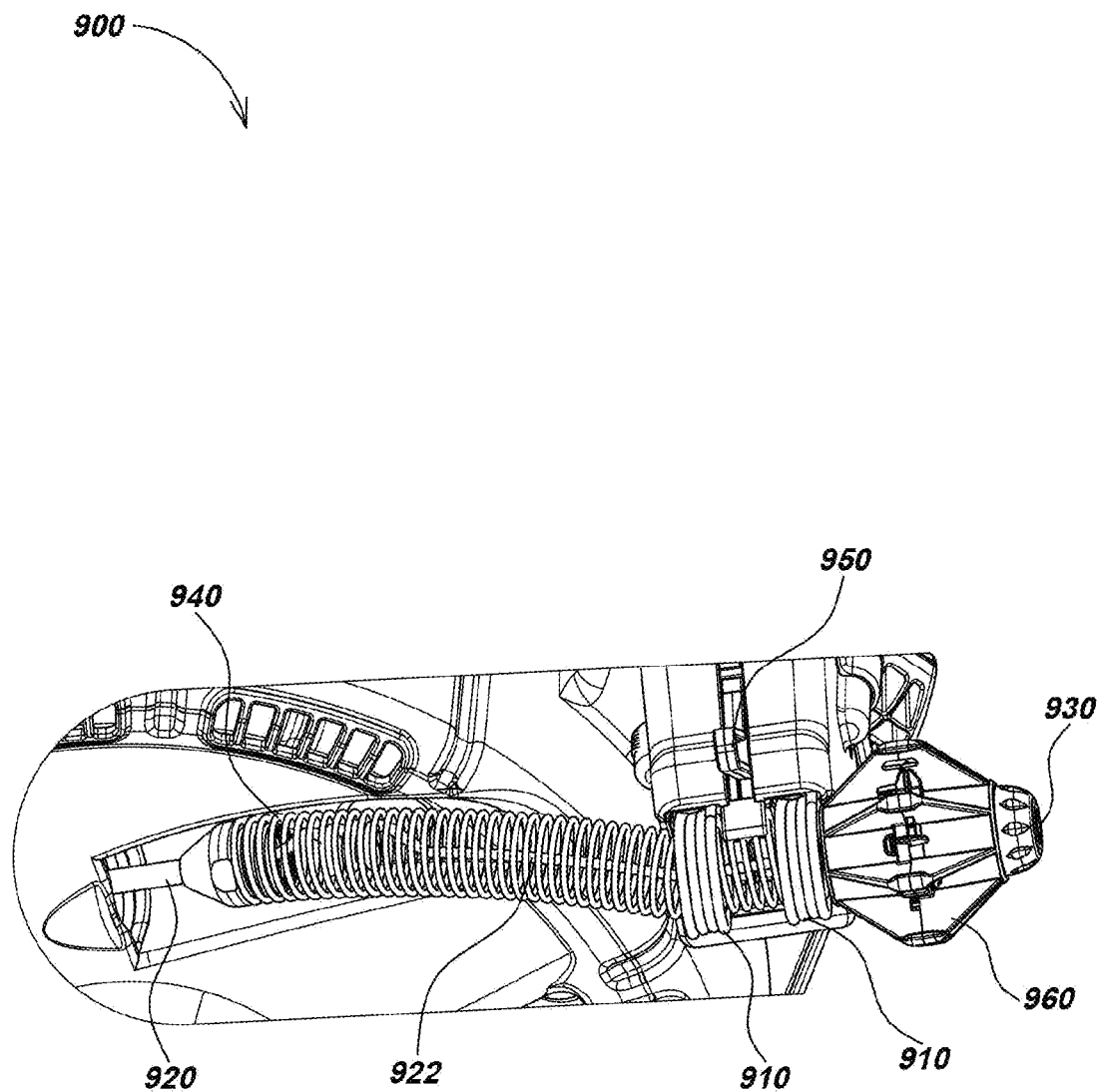
FIG. 9 is an illustration of an embodiment of a cable storage drum with cable guides for a push-cable, in accordance with certain aspects of the present invention.

FIG. 9 illustrates details of a cable storage drum 900 with cable guides 910 for guiding a push-cable 920 into and out of cable storage drum 900. A camera head 930 may be attached to the distal end of push-cable 920. A coil 940 may be provided to help facilitate movement of push-cable 920 and a camera head 930 as it moves through a utility pipe or conduit during inspection. The push-cable 920 may be terminated at a proximal end of coil 940, and a flexmitter-flex connector (922) may then connect camera head 930 at a distal end of coil 940 to push-cable 920 through coil 940. The coil 940 will help both the push-cable 920 and camera head 930 negotiate bends and turns. A push-cable lock latch or lock 950 may be used to keep push-cable 1020 from moving during storage and transportation. A pipe guide 960 may also be attached to push-cable 920 and camera head 930 to help protect the camera head 930 as it is moving in and out of a utility or pipe during inspection.

The scope of the invention is not intended to be limited to the aspects shown herein but are to be accorded the full scope consistent with the disclosures herein and their equivalents, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use embodiments of the present invention. Various modifications to these aspects will be readily apparent to those skilled in the art, and the generic principles defined herein may be applied to other aspects without departing from the spirit or scope of the disclosure. Thus, the disclosure is not intended to be limited to the aspects shown herein but is to be accorded the widest scope consistent with the disclosures herein and in the appended drawings.

We claim:

1. A cable storage drum for a pipe inspection system, the cable storage drum comprising;
   a cable storage drum;
   a push-cable with a plurality of conductors, the push-cable being stored in the cable storage drum in a plurality of coils;
   a housing for removably receiving and rotatably supporting the cable storage drum, the housing comprising:
   an inner hub around which the cable storage drum may rotate bidirectionally;
   a substantially hollow core outer cone removably attachable to the cable storage drum, the hollow core outer cone including a removable inner core module, wherein the inner core module includes a plurality of component interfaces for electrical or mechanical components, or both; and
   a battery module interface attached inside the inner core module, wherein the outer cone and the inner core module including the battery module interface and the plurality of component interfaces rotate simultaneously with the cable storage drum.

2. The cable storage drum of claim 1, wherein the plurality of component interfaces include one or more of electrical interfaces, mechanical interface, reel-counters, wireless communication equipment, and satellite positioning equipment.

3. The cable storage drum of claim 2, wherein satellite positioning equipment includes GNSS equipment.

4. The cable storage drum of claim 1, wherein the battery module interface provides connectivity for multiple battery types and brands.

5. The cable storage drum of claim 1, wherein the battery module interface mates with a contact plate sealed inside the inner cone.

6. The cable storage drum of claim 1, further comprising a camera head operatively connected to a distal end of the push-cable.

7. The cable storage drum of claim 1, wherein the inner hub includes a rotation module.

8. The cable storage drum of claim 7, wherein the rotation module comprises a set of front bearings, and a set of rear bearings.

9. The cable storage drum of claim 8, wherein the set of rear bearings is physically larger than the set of front bearings providing removable access of the battery module interface.

10. The cable storage drum of claim 1, wherein the outer cone includes an aperture for providing front-side access to the inner cone.

11. The cable storage drum of claim 7, wherein the set of front and set of rear bearings are at least partially enclosed by a clamshell assembly housing comprising a first half clamshell enclosure and a second half clamshell enclosure which are removably attachable to each other.

12. The cable storage drum of claim 1, wherein the inner cone includes a battery mounting pocket including an exposed heatsink comprising an exposed thermally conductive surface for dissipating heat away from the battery module.

13. The cable storage drum of claim 3, wherein the wireless communication equipment and the satellite positioning equipment include antennas, and wherein the antennas are positioned in a front side of the inner core module near a central axis of rotation of the cable storage drum.

14. The cable storage drum of claim 1, further comprising one or more retractable kickstands for holding the cable storage drum in one or more upright or tilt-back positions.

15. The cable storage drum of claim 1, further comprising one or more cable guides.

16. The cable storage drum of claim 15, wherein the one or more cable guides comprise a split, two point cable exit guide including two feed-in/feed-out support apertures, wherein the support apertures are separated from each other by a distance of at least 4 times an inside aperture diameter.

17. The cable storage drum of claim 6, further comprising a plurality of electrical contacts between the inner core module and the outer cone which mate when the inner core module is installed into the outer cone, and wherein the plurality of electrical contacts provide connections for one or more of power, data, or electrical signals between the component interfaces and the camera.

18. The cable storage drum of claim 1, further comprising at least one latch for securing the inner core module to the outer cone.

19. The cable storage drum of claim 1 further comprising one or more operator controls exposed on an outside face of the inner core module.

20. The cable storage drum of claim 1 further comprising one or more interface indicators visible on an outside face of the inner core module.

21. The cable storage drum of claim 20, wherein one or more of the interface indicators is a wireless connection status LED.

22. The cable storage drum of claim 20, wherein one or more of the interface indicators is a power on status LED.

23. The cable storage drum of claim 11, further comprising a handle attached to a top of the clamshell assembly housing.

24. The cable storage drum of claim 15, wherein at least one of the one or more cable guides includes a camera spring locking mechanism.

25. The cable storage drum of claim 1, further comprising a variable drag drum brake for slowing down or stopping rotation of the cable storage drum.

26. The cable storage drum of claim 1, further comprising an internally powered drum drive module.

27. The cable storage drum of claim 3, wherein the GNSS equipment includes a GNSS receiver.

28. The cable storage drum of claim 2, wherein the wireless communication equipment includes a orientation sensing module.

29. The cable storage drum of claim 28, wherein the orientation sensing module comprises at least one of a compass and an Inertial Navigation System (INS) sensor.

30. The cable storage drum of claim 2, wherein the wireless communication equipment includes a rotation sensor for sensing rotations between the cable storage drum and the clamshell assembly.

31. The cable storage drum of claim 6, further comprising a camera cable including a spring-loaded removable electrical interface which is mechanically secured to the cable storage drum and the outer cone assembly.

32. The cable storage drum of claim 31, wherein the removable electrical interface is a three part stack assembly with a middle component connect via spring loaded contacts to an inside of the inner core module and the camera cable on an outside of the inner core module.

33. The cable storage drum of claim 1, wherein the inner core module includes one or more handles.

34. The cable storage drum of claim 1, wherein a NFT (Near Field Tag) is permanently or removably attached to a front exposed face of the inner core module.

35. The cable storage drum of claim 1, further comprising a dry cable termination cable capture attached on an inside of the cable storage drum, and a spring contact interface attached on a reverse side of the cable storage drum that contacts at least one electronic interface inside the inner core module.

36. The cable storage drum of claim 1, wherein the cable storage drum is substantially-round shaped.

37. The cable storage drum of claim 36, wherein the enclosure is substantially-round shaped.

* * * * *